United States Patent
Eng et al.

(10) Patent No.: US 12,388,730 B2
(45) Date of Patent: Aug. 12, 2025

(54) CLASSIFIER MODEL FOR DETERMINING A NETWORK STATUS OF A COMMUNICATION NETWORK FROM LOG DATA

(71) Applicant: Telefonaktiebolaget LM Ericsson (publ), Stockholm (SE)

(72) Inventors: Chin Lam Eng, Tokyo (JP); Yu Jia, Beijing (CN); Lichao Gui, Jiangsu (CN); Chee Wai Ng, Sydney (AU); Philipp Frank, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/563,029

(22) PCT Filed: May 28, 2021

(86) PCT No.: PCT/CN2021/096723
§ 371 (c)(1),
(2) Date: Nov. 21, 2023

(87) PCT Pub. No.: WO2022/246793
PCT Pub. Date: Dec. 1, 2022

(65) Prior Publication Data
US 2024/0250886 A1    Jul. 25, 2024

(51) Int. Cl.
*H04L 43/04*    (2022.01)
*H04L 41/16*    (2022.01)

(52) U.S. Cl.
CPC .............. *H04L 43/04* (2013.01); *H04L 41/16* (2013.01)

(58) Field of Classification Search
CPC ................................ H04L 43/04; H04L 41/16
See application file for complete search history.

(56) References Cited

U.S. PATENT DOCUMENTS

| 11,429,834 | B1* | 8/2022 | Xue | G06F 40/284 |
| 2016/0125028 | A1* | 5/2016 | Silvestri | G06F 16/3338 |
| | | | | 707/718 |

(Continued)

FOREIGN PATENT DOCUMENTS

| CN | 105653444 A | 6/2016 |
| CN | 108566287 A | 9/2018 |

(Continued)

OTHER PUBLICATIONS

International Search Report and Written Opinion of the International Searching Authority, PCT/CN2021/096723, mailed Feb. 28, 2022, 9 pages.

(Continued)

*Primary Examiner* — Philip C Lee
(74) *Attorney, Agent, or Firm* — Sage Patent Group

(57) ABSTRACT

A method includes extracting, from first log data relating to operations of wireless devices and/or nodes in the communication network, textual elements and numerical elements; transforming the textual elements to a first vector space to determine respective textual element vectors; transforming the numerical elements to a second vector space to determine respective numerical element vectors; embedding and clustering the textual element vectors and the numerical element vectors to determine clusters of embedded vectors, wherein the embedding includes, for a plurality of wireless device sessions, embedding at least one textual element vector and at least one numerical element vector into a single embedded vector representing the particular wireless device session; and training a classifier model to determine a (Continued)

network status from second log data, wherein the classifier model is trained using the plurality of clusters of embedded vectors.

19 Claims, 16 Drawing Sheets

(56) References Cited

U.S. PATENT DOCUMENTS

| | | | |
|---|---|---|---|
| 2019/0220385 A1 | 7/2019 | Allen et al. | |
| 2019/0392082 A1* | 12/2019 | Bell | G06N 3/08 |
| 2020/0176121 A1 | 6/2020 | Dalal et al. | |
| 2020/0285737 A1 | 9/2020 | Kraus et al. | |
| 2020/0364107 A1 | 11/2020 | Turek et al. | |
| 2020/0372213 A1 | 11/2020 | Sharma et al. | |
| 2022/0284340 A1* | 9/2022 | Choudhary | G06N 20/10 |

FOREIGN PATENT DOCUMENTS

| | | | | |
|---|---|---|---|---|
| EP | 3654585 A1 | 5/2020 | | |
| EP | 3716111 A1 * | 9/2020 | | G06F 21/554 |

OTHER PUBLICATIONS

Zte, "Use case and potential solutions of MDA assisted health maintenance," 3GPP TSG-SA5 Meeting #131e, S5-203082, e-Meeting, May 25-Jun. 3, 2020, 4 pages.

Huawei, "Add descriptions of MDA role in management loop," 3GPP TSG SA WG5 Meeting 137-e, S5-213061, electronic meeting, online, May 10-19, 2021, 2 pages.

Deutsche Telekom, "High-level principles and definitions for the AI/ML-based functional framework for RAN intelligence," 3GPP TSG-RAN3 Meeting #112-e, R3-211632, 8 pages.

Mikolov, Tomas et al., "Distributed Representations of Words and Phrases and their Compositionality," Proceedings of the 27th Annual Conference on Neural Information Processing Systems, Oct. 16, 2013, 9 pages.

Kobayashi, Satoru et al., "Towards an NLP-based log template generation algorithm for system log analysis," CFI '14, Jun. 18-20, 2014, Tokyo, Japan, 4 pages.

Wang, Jin et al., "LogEvent2vec: LogEvent-to-Vector Based Anomaly Detection for Large-Scale Logs in Internet of Things," Sensors 2020, vol. 20, Apr. 2020, 19 pages.

* cited by examiner

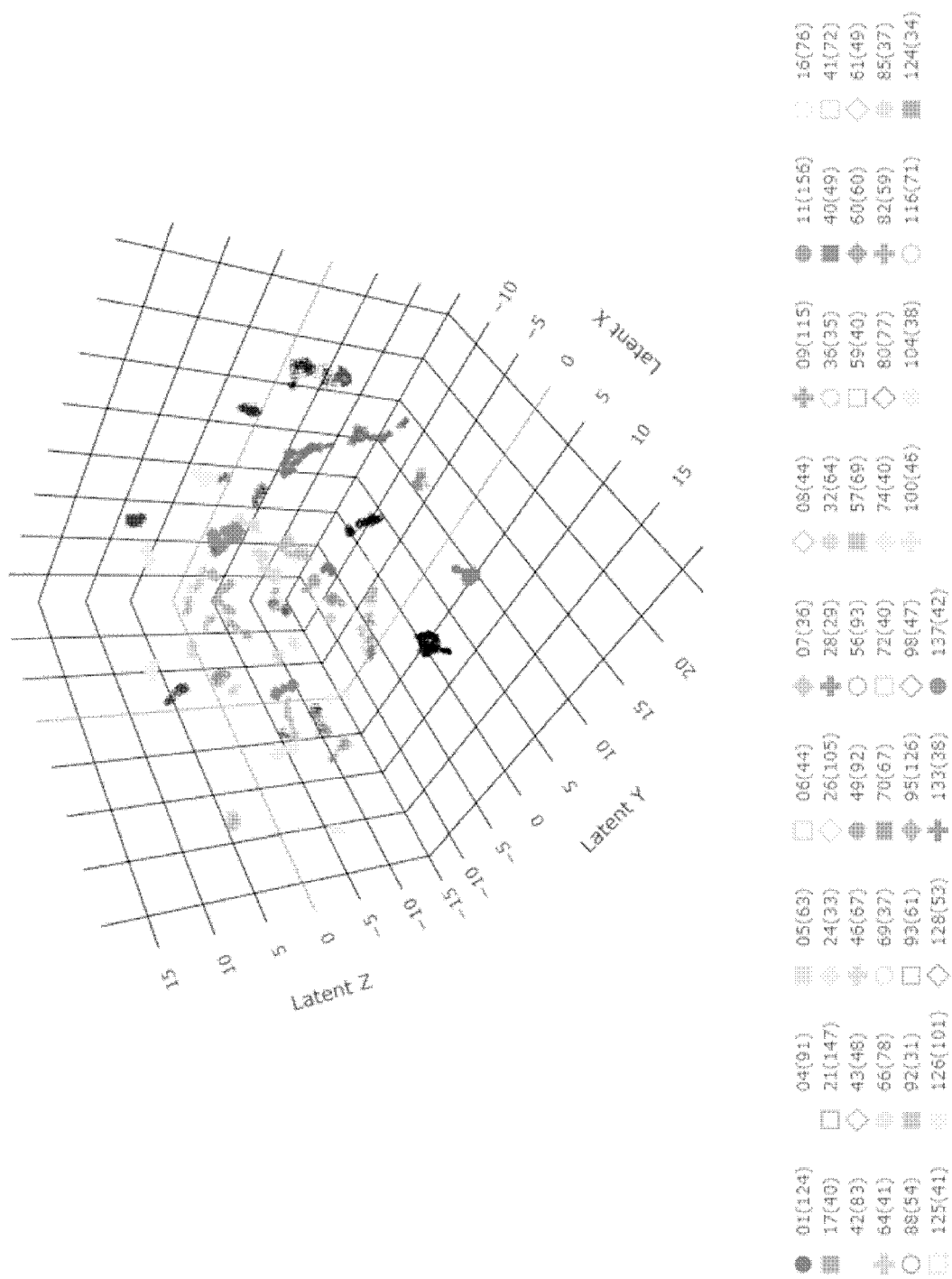

| idx | sub_idx | Time | Message | label | NR_PCI | SS-RSRP | SS-SINR | RSRP1 | RSRP2 | RSRP3 | RSRP4 | RSRP5 | RSRP6 | CQI | TxPower |
|---|---|---|---|---|---|---|---|---|---|---|---|---|---|---|---|
| 5141 | 0 | 03:03:19.850 | NR->RRCReconfigurationComplete | 100 | 750 | -77.54 | -3.15 | -76 | -77.54 | -81.01 | -83.66 | -83.96 | -89.8 | 10.62 | null |
| 5141 | 1 | 03:03:19.890 | NR->SIBType1 | 100 | 750 | -77.54 | -3.15 | -76 | -77.54 | -81.01 | -83.66 | -83.96 | -89.8 | 10.62 | 16 |
| 5141 | 2 | 03:03:19.960 | NR->RRCReconfiguration | 100 | 750 | -77.54 | -3.15 | -76 | -77.54 | -81.01 | -83.66 | -83.96 | -89.8 | 10.62 | 16 |
| 5141 | 3 | 03:03:19.972 | NR->RRCReconfigurationComplete | 100 | 750 | -77.54 | -3.15 | -76 | -77.54 | -81.01 | -83.66 | -83.96 | -89.8 | 10.62 | 16 |
| 5141 | 4 | 03:03:20.753 | NR->MeasurementReport | 100 | 750 | -82.34 | 2.8 | -78.48 | -80.65 | -82.34 | -85.17 | -87.78 | -94.05 | 10.62 | 16 |
| 5141 | 5 | 03:03:20.770 | NR->RRCReconfiguration | 100 | 750 | -82.34 | 2.8 | -78.48 | -80.65 | -82.34 | -85.17 | -87.78 | -94.05 | 10.62 | 16 |
| 5141 | 6 | 03:03:20.832 | NR->RRCReconfigurationComplete | 100 | 636 | -78.29 | 6.61 | -78.29 | -81.71 | -83.91 | -84.78 | -90.38 | -94.68 | 10.1 | null |
| 5141 | 7 | 03:03:20.853 | NR->SIBType1 | 100 | 636 | -78.29 | 6.61 | -78.29 | -81.71 | -83.91 | -84.78 | -90.38 | -94.68 | 10.1 | null |
| 5141 | 8 | 03:03:20.940 | NR->RRCReconfiguration | 100 | 636 | -78.29 | 6.61 | -78.29 | -81.71 | -83.91 | -84.78 | -90.38 | -94.68 | 10.1 | 10 |
| 5141 | 9 | 03:03:20.952 | NR->RRCReconfigurationComplete | 100 | 636 | -78.29 | 6.61 | -78.29 | -81.71 | -83.91 | -84.78 | -90.38 | -94.68 | 10.1 | 10 |
| 5141 | 10 | 03:03:21.075 | NR->SIBs(Sib2,Sib4) | 100 | 636 | -78.29 | 6.61 | -78.29 | -81.71 | -83.91 | -84.78 | -90.38 | -94.68 | 10.1 | 10 |

Fig. 12(a)

| idx | sub_idx | Time | Message | label | NR_PCI | SS-RSRP | SS-SINR | RSRP1 | RSRP2 | RSRP3 | RSRP4 | RSRP5 | RSRP6 | CQI | TxPower |
|---|---|---|---|---|---|---|---|---|---|---|---|---|---|---|---|
| 938 | 0 | 10:08:59.256 | NR->CellGroupConfig | 126 | 197 | -89.25 | -0.44 | -82 | -89.25 | -92.88 | null | null | null | 11.16 | 21 |
| 938 | 1 | 10:08:59.326 | NR->RRCReconfigurationComplete | 126 | 197 | -89.25 | -0.44 | -82 | -89.25 | -92.88 | null | null | null | 11.16 | 21 |
| 938 | 2 | 10:08:59.367 | NR->MIB | 126 | 119 | -75.63 | 12.94 | -75.63 | -89.75 | null | null | null | null | 11.44 | 20 |
| 938 | 3 | 10:08:59.407 | NR->SIBType1 | 126 | 119 | -75.63 | 12.94 | -75.63 | -89.75 | null | null | null | null | 11.44 | 20 |
| 938 | 4 | 10:08:59.412 | NR->Registration request | 126 | 119 | -75.63 | 12.94 | -75.63 | -89.75 | null | null | null | null | 11.44 | 20 |
| 938 | 5 | 10:08:59.412 | NR->ULInformationTransfer | 126 | 119 | -75.63 | 12.94 | -75.63 | -89.75 | null | null | null | null | 11.44 | 20 |
| 938 | 6 | 10:08:59.448 | NR->SIBType1 | 126 | 119 | -75.63 | 12.94 | -75.63 | -89.75 | null | null | null | null | 11.44 | 20 |
| 938 | 7 | 10:08:59.449 | NR->DLInformationTransfer | 126 | 119 | -75.63 | 12.94 | -75.63 | -89.75 | null | null | null | null | 11.44 | 20 |
| 938 | 8 | 10:08:59.449 | NR->Registration accept | 126 | 119 | -75.63 | 12.94 | -75.63 | -89.75 | null | null | null | null | 11.44 | 20 |
| 938 | 9 | 10:08:59.452 | NR->Registration complete | 126 | 119 | -75.63 | 12.94 | -75.63 | -89.75 | null | null | null | null | 11.44 | 20 |
| 938 | 10 | 10:08:59.452 | NR->ULInformationTransfer | 126 | 119 | -75.63 | 12.94 | -75.63 | -89.75 | null | null | null | null | 11.44 | 20 |

Fig. 12(b)

CLASSIFIER MODEL FOR DETERMINING A NETWORK STATUS OF A COMMUNICATION NETWORK FROM LOG DATA

CROSS REFERENCE TO RELATED APPLICATIONS

This application is a 35 U.S.C. § 371 national stage application of PCT International Application No. PCT/CN2021/096723 filed on May 28, 2021, the disclosure and content of which is incorporated by reference herein in its entirety.

TECHNICAL FIELD

This disclosure relates to techniques for training a classifier model to determine a network status of a communication network from log data.

BACKGROUND

Modern information communication networks must remain continuously connected to provide reliable services to society and enterprises. However, communication networks are complex systems consisting of many different physical nodes, virtual nodes, software and hardware from different manufacturers, and network and wireless device failures do occur. When an undesired incident, fault or system failure occurs during wireless network operation, rapid recovery is crucial for high end-user quality and service satisfaction.

Network nodes and wireless devices in a communication network maintain log data (also known as logs, system logs, or log records) in which information about events and states of the network and/or connected wireless devices are recorded. Log data can include data about the interactions between connected wireless devices and network infrastructure across multiple interfaces.

System logs are therefore a key source of information that engineers use to investigate and troubleshoot a fault in a system. More generally, log data can be used for issue detection, system fault root cause investigation, system health audits, system characterisation, system optimisation, performance benchmarking, and the identification of system compatibility issues.

Log data typically includes textual information and measurement variables (i.e. numerical data), but the formatting and content of the data varies by manufacturer, operator, and/or operating system of the node or wireless device generating the log data. This makes extracting useful information from the combined log data difficult.

One method of extracting the necessary information from the log data is to manually analyse log events. However, this approach is time consuming and does not scale efficiently in a large-scale network system. A further method of evaluating log data is to use known keyword searching based on experience and domain-specific knowledge (i.e. knowledge of the communication network or the technologies used in the network). However, due to the urgency of many of the applications, the searching is focused on a limited subset time range and can therefore omit critical information. A further challenge with this approach is that system hardware and software are continuously upgraded and therefore the known keywords repository must also be continuously updated.

Efficient methods for the analysis of log data are therefore required for tasks such as system fault root cause investigation (i.e. investigating why a fault has occurred).

In view of these challenges, several automated log data processing techniques have been proposed. With advancements in machine learning and natural language processing (NLP) methods, recent techniques have applied these methods to the transformation and analysis of textual log event information. Two such examples are term frequency-inverse document frequency (tf-idf) and word2vec, as described in "Distributed representations of words and phrases and their compositionality" by T. Mikolov, I. Sutskever, K. Chen, G. S. Corrado, and and J. Dean, In Proceedings of the 27th Annual Conference on Neural Information Processing Systems, 2013. The paper "Log Event2vec Log Event-to-vector based anomaly detection for large-scale logs in internet of things" by J. Wang et al., *Sensors* 2020, 20, 2451, describes a technique for anomaly detection by vectorising the event message and transforming it into a log sequence vector. This can then be used to train a standard supervised learning classifier.

These methods focus on the textual content of the log data, and therefore omit important information that can be derived from the measurement variables from the system, e.g. system performance metrics. Due to this lack of meaningful abstraction and aggregation of the textual messages and performance metrics in the log data, it is difficult for service providers to further exploit the data for insights and/or accurately identify a system failure root cause.

Similar issues arise when log data is to be evaluated for the purpose of system health audits, system characterisation, system optimisation, performance benchmarking, and the identification of system compatibility issues.

Therefore, there is a need for improved techniques for analysing and extracting useful information from log data.

SUMMARY

Certain aspects of the present disclosure and their embodiments may provide solutions to the above or other challenges.

According to a first aspect, there is provided a method performed by an apparatus for training a classifier model to determine a network status relating to a communication network and/or a wireless device from log data. The method comprises: extracting, from first log data relating to operations of one or more wireless devices and/or nodes in the communication network, a plurality of textual elements and a plurality of numerical elements; transforming the plurality of textual elements to a first vector space to determine respective textual element vectors; transforming the plurality of numerical elements to a second vector space to determine respective numerical element vectors; embedding and clustering the textual element vectors and the numerical element vectors to determine a plurality of clusters of embedded vectors, wherein the embedding comprises, for a plurality of wireless device sessions, embedding at least one textual element vector and at least one numerical element vector into a single embedded vector representing the particular wireless device session; and training a classifier model to determine a network status from second log data, wherein the classifier model is trained using the plurality of clusters of embedded vectors.

According to a second aspect, there is provided a method performed by an apparatus for analysing second log data relating to operations of one or more wireless devices and/or nodes in a communication network. The method comprises receiving second log data; and using a classifier model trained according to the first aspect, or any embodiment thereof, to determine a network status from the received second log data.

According to a third aspect, there is provided a computer program comprising computer readable code configured such that, on execution by a suitable computer or processor, the computer or processor is caused to perform the method according to the first aspect, the second aspect, or any embodiments thereof.

According to a fourth aspect, there is provided a computer readable medium comprising the computer program according to the third aspect or any embodiment thereof.

According to a fifth aspect, there is provided a computer program product comprising the computer readable medium according to the fourth aspect or any embodiment thereof.

According to a sixth aspect, there is provided an apparatus configured for training a classifier model to determine a network status relating to a communication network and/or a wireless device from log data. The apparatus is configured to: extract, from first log data relating to operations of one or more wireless devices and/or nodes in the communication network, a plurality of textual elements and a plurality of numerical elements; transform the plurality of textual elements to a first vector space to determine respective textual element vectors; transform the plurality of numerical elements to a second vector space to determine respective numerical element vectors; embed and cluster the textual element vectors and the numerical element vectors to determine a plurality of clusters of embedded vectors, wherein the embedding comprises, for a plurality of wireless device sessions, embedding at least one textual element vector and at least one numerical element vector into a single embedded vector representing the particular wireless device session; and train a classifier model to determine a network status from second log data, wherein the classifier model is trained using the plurality of clusters of embedded vectors.

According to a seventh aspect, there is provided an apparatus configured for analysing second log data relating to operations of one or more wireless devices and/or nodes in a communication network. The apparatus is configured to receive second log data; and use a classifier model trained according to the sixth aspect, or any embodiment thereof, to determine a network status from the received second log data.

According to an eighth aspect, there is provided an apparatus for training a classifier model to determine a network status relating to a communication network and/or a wireless device from log data. The apparatus comprises a processor and a memory, said memory containing instructions executable by said processor whereby said apparatus is operative to: extract, from first log data relating to operations of one or more wireless devices and/or nodes in the communication network, a plurality of textual elements and a plurality of numerical elements; transform the plurality of textual elements to a first vector space to determine respective textual element vectors; transform the plurality of numerical elements to a second vector space to determine respective numerical element vectors; embed and cluster the textual element vectors and the numerical element vectors to determine a plurality of clusters of embedded vectors, wherein the embedding comprises, for a plurality of wireless device sessions, embedding at least one textual element vector and at least one numerical element vector into a single embedded vector representing the particular wireless device session; and train a classifier model to determine a network status from second log data, wherein the classifier model is trained using the plurality of clusters of embedded vectors.

According to a ninth aspect, there is provided an apparatus for analysing second log data relating to operations of one or more wireless devices and/or nodes in a communication network. The apparatus comprises a processor and a memory, said memory containing instructions executable by said processor whereby said apparatus is operative to receive second log data; and use a classifier model trained according to the eighth aspect, or any embodiment thereof, to determine a network status from the received second log data.

The techniques disclosed herein provide a method for training a classifier model that utilises both textual elements and numerical elements of log data from multiple log data sources. By transforming the textual and numerical elements (e.g. measurement metrics) into respective vector spaces and learning the feature abstraction jointly as part of the clustering step, an efficient merging of both textual and numeric features is achieved.

The network status determined by the classifier model, can be the status of a communication network, the status of a part of a communication network, e.g. a base station or a cell of a base station, and/or the status of a wireless device that is using the network. The network status according to the disclosed techniques can relate to the root cause of a failure in the system, with the failure relating to or affecting one or more wireless devices. The use of a classifier model is better than simply identifying an event message comprising the words 'failure' or 'reject', since the failure or rejection is typically a symptom of the problem, and the actual root cause often occurred several events prior to the failure. The session-based approach described herein is based on a more complete picture of the system than current methods, and evaluates a (complete or partial) session for a particular wireless device and thereby enhances the reliability of the classification of the network status provided by the trained classifier model.

In some embodiments of the techniques disclosed herein, log data from different wireless devices and/or network nodes is combined according to the time sequence that the logged events occurred. A wireless device session can be determined from consecutive signalling events relating to a particular wireless device based on a pre-defined session window size, and optionally an amount of overlap between the sessions. The session window size defines the length of a log sequence relating to a wireless device session. The session-based analysis according to the techniques described herein utilises information from both uplink and downlink and thereby increases the reliability of the trained classifier model in determining a network status.

BRIEF DESCRIPTION OF THE DRAWINGS

Some of the embodiments contemplated herein will now be described more fully with reference to the accompanying drawings, in which:

FIG. 11 is a graph illustrating exemplary clusters obtained using the method of FIG. 3 to embed log data in 3-dimensional space;

FIGS. 12(a) and 12(b) show exemplary log data comprising signalling messages and metrics for two different clusters;

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Briefly, the techniques disclosed herein provide a method performed by an apparatus to train a classifier model to determine a network status of a communication network using log data. The network status can relate to the operational state of the communication network, or of a part of a communication network, such as a base station or cell. The network status can also or alternatively relate to the operational state of a wireless device that is using the communication network. For example one or more different network statuses can relate to the correct operation of the communication network and/or one or more wireless devices that are using the communication network. Other possible statuses can be or relate to failures in the network, and/or failures experienced by or relating to one or more wireless devices. Different types of failures can be associated with different network statuses, such as disconnections, high packet loss, low signal quality, etc. The log data can relate to operations of one or more wireless devices and/or network nodes in the network. The wireless devices and/or network nodes can be operating according to any suitable communications technology, including any of the Third Generation Partnership Project (3GPP) standards, such as Long Term Evolution (LTE)/4$^{th}$ Generation, or New Radio (NR)/5$^{th}$ Generation. Textual elements and numerical elements (e.g. measurement indicators/measurements) are extracted from the log data. Techniques are used to transform the textual data into a textual element vector space, and the numerical data is transformed into a numerical element vector space. The textual element vectors and numerical element vectors are embedded and clustered on a wireless device session basis. The clusters are used to train a classifier model to determine a network status.

Figure 1:
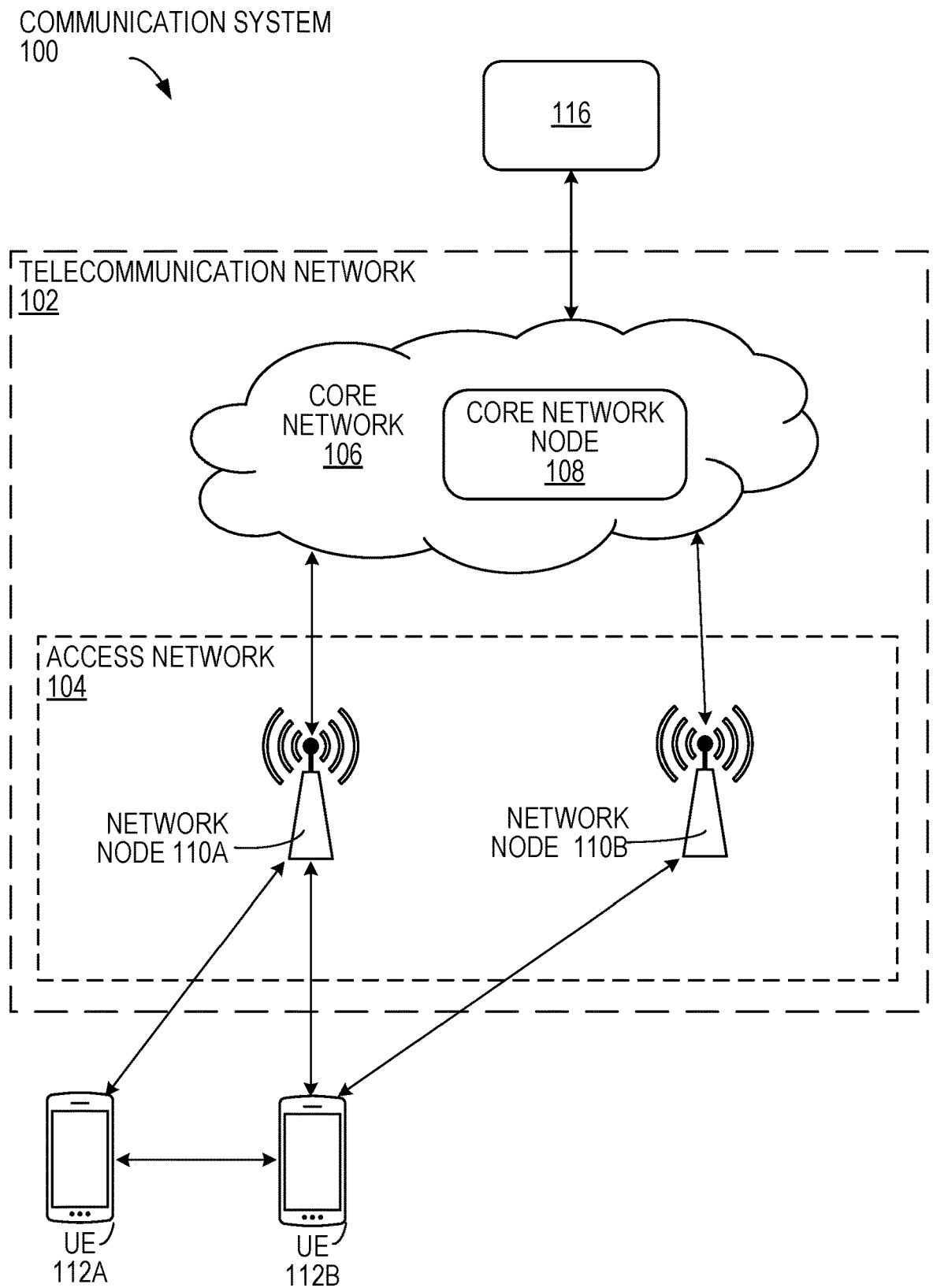
FIG. 1 is an example of a communication system from which log data can be obtained.

FIG. 1 shows an example of a communication system 100 from which the log data used herein can be received.

In the example, the communication system 100 includes a telecommunication network 102, i.e. a communication network, that includes an access network 104, such as a radio access network (RAN), and a core network 106, which includes one or more core network nodes 108. The access network 104 includes one or more access network nodes, such as network nodes 110a and 110b (one or more of which may be generally referred to as network nodes 110), or any other similar 3GPP access node or non-3GPP access point. The network nodes 110 facilitate direct or indirect connection of wireless devices (also referred to as user equipment (UEs)), such as by connecting UEs 112a and 112b (one or more of which may be generally referred to as wireless devices 112 or UEs 112) to the core network 106 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 100 may include any number of wired or wireless networks, network nodes, UEs, and/or any other components or systems that may facilitate or participate in the communication of data and/or signals whether via wired or wireless connections. The communication system 100 may include and/or interface with any type of communication, telecommunication, data, cellular, radio network, and/or other similar type of system.

The UEs 112 may be any of a wide variety of communication devices, including wireless devices arranged, configured, and/or operable to communicate wirelessly with the network nodes 110 and other communication devices. Similarly, the network nodes 110 are arranged, capable, configured, and/or operable to communicate directly or indirectly with the UEs 112 and/or with other network nodes or equipment in the telecommunication network 102 to enable and/or provide network access, such as wireless network access, and/or to perform other functions, such as administration in the telecommunication network 102.

The core network 106 includes one more core network nodes (e.g., core network node 108) that are structured with hardware and software components. Features of these components may be substantially similar to those described with respect to the UEs, network nodes, and/or hosts, such that the descriptions thereof are generally applicable to the corresponding components of the core network node 108. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

As a whole, the communication system 100 of FIG. 1 enables connectivity between the UEs, network nodes, and servers or devices in another communication system. In that sense, the communication system may be configured to operate according to predefined rules or procedures, such as specific standards that include, but are not limited to: Global System for Mobile Communications (GSM); Universal Mobile Telecommunications System (UMTS); LTE, and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

An apparatus 116 is also shown in FIG. 1 as connected to the core network 106. The apparatus 116 is configured to operate according to any of the embodiments described herein to receive the log data from one or more parts of the telecommunication network 102 and/or from one or more of the UEs 112, and to train the classifier model using the log data. Although the apparatus 116 is shown as being outside the telecommunication network 102, in other implementations it will be appreciated that the apparatus 116 may be part of the core network 106, for example part of a core network node 108, or part of the access network 104, for example part of a network node 110. The apparatus 116 may be under the ownership or control of the network operator of the communication system 100/telecommunication network 102, or a service provider other than the operator or provider of the access network 104 and/or the telecommunication network 102.

Any of the access network nodes 110, UEs 112 and/or core network nodes 106 can collect and store respective log data relating to their operations. Certain events occurring in or by the UE or network node will be recorded or stored in the log. These logged events are referred to herein as 'log events', and the collection of log events and the data relating to the log events is referred to as 'log data'. In the case of the access network nodes 110 and/or UEs 112, the respective log data can comprise logs of events (i.e. log events) relating to any one or more of: Radio Resource Control, RRC, signalling messages; Non-Access Stratum, NAS, layer signalling messages; physical layer measurements or measurement reports; internal events and signalling traces for the network nodes. The log data for the access network nodes 110 can also or alternatively include log events relating to S1 interface messages; and/or X2 interface messages. It will be appreciated that while log data may relate to operations occurring according to an agreed standard (e.g. a 3GPP standard), the format of the log data may vary by manufacturer of the UE 112 or node 106, 110 storing the log. As noted, the log data for any of the access network nodes 110, UEs 112 and/or core network node 106 can include logs of internal events, these internal events relate to internal operations of those UEs 112 or nodes 106, 110. These internal operations may not be standardised, and the types of events logged (and the manner in which they are logged) can vary by manufacturer. Those skilled in the art will be aware of other types of data that can be included in log data.

Figure 2:
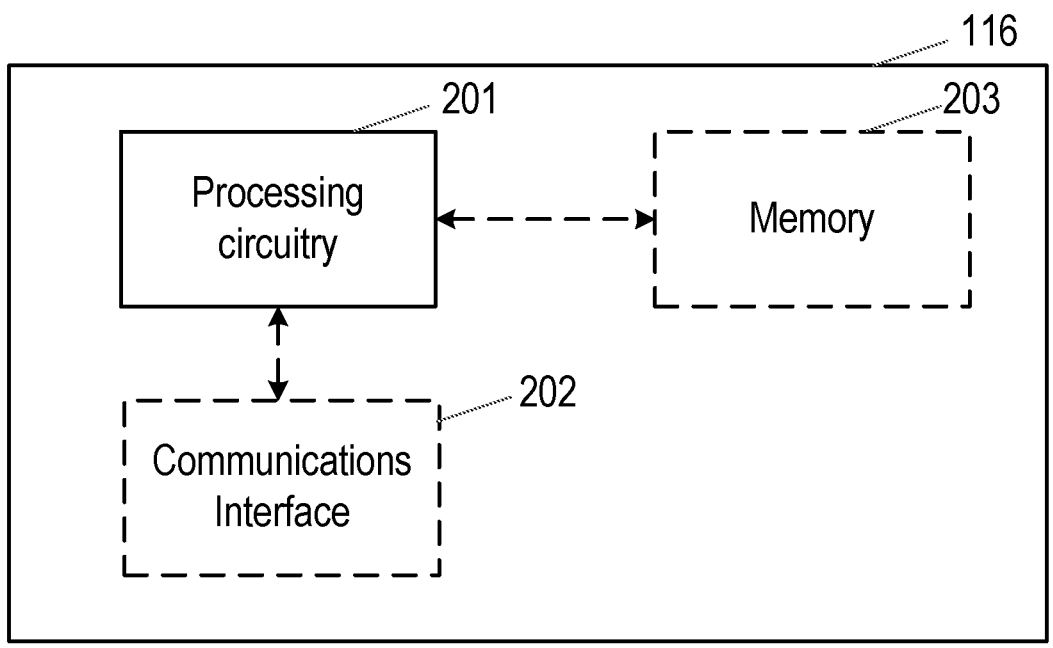
FIG. 2 is a block diagram of an apparatus according to various embodiments.

FIG. 2 illustrates the apparatus 116 according to various embodiments that can be used to implement the techniques described herein. For example the apparatus 116 can be used to implement one or more, or all, of the steps of the method shown in FIG. 14 or FIG. 15.

The apparatus 116 comprises processing circuitry (or logic) 201. It will be appreciated that the apparatus 116 may comprise one or more virtual machines running different software and/or processes. The apparatus 116 may therefore comprise one or more servers and/or storage devices and/or may comprise cloud computing infrastructure that runs the software and/or processes.

The processing circuitry 201 controls the operation of the apparatus 116 and can implement the methods described herein. The processing circuitry 201 can comprise one or more processors, processing units, multi-core processors or modules that are configured or programmed to control the apparatus 116 in the manner described herein. In particular implementations, the processing circuitry 201 can comprise a plurality of software and/or hardware modules that are each configured to perform, or are for performing, individual or multiple steps of the method described herein.

In some embodiments, the apparatus 116 may optionally comprise a communications interface 202. The communications interface 202 can be for use in receiving log data relating to one or more UEs 112 and/or one or more network nodes 110. The log data may be received directly or indirectly from the one or more UEs 112 and/or the one or more network nodes 110. The communications interface 202 may also be for communicating with other apparatuses, other servers, and/or one or more storage devices where log data may be stored. The processing circuitry 201 may be configured to control the communications interface 202 to transmit to and/or receive information, data, signals, or similar.

Optionally, the apparatus 116 may comprise a memory 203. In some embodiments, the memory 203 can be configured to store program code that can be executed by the processing circuitry 201 to perform any of the methods described herein. Alternatively or in addition, the memory 203 can be configured to store any information, data, signals, or similar that are described herein, such as the log data. The processing circuitry 201 may be configured to control the memory 203 to store such information therein.

The disclosed techniques for training a classifier model are described below with reference to the flow charts in FIGS. 3-10. Unless otherwise indicated, the steps in the flow charts can be performed by the apparatus 116.

Figure 3:
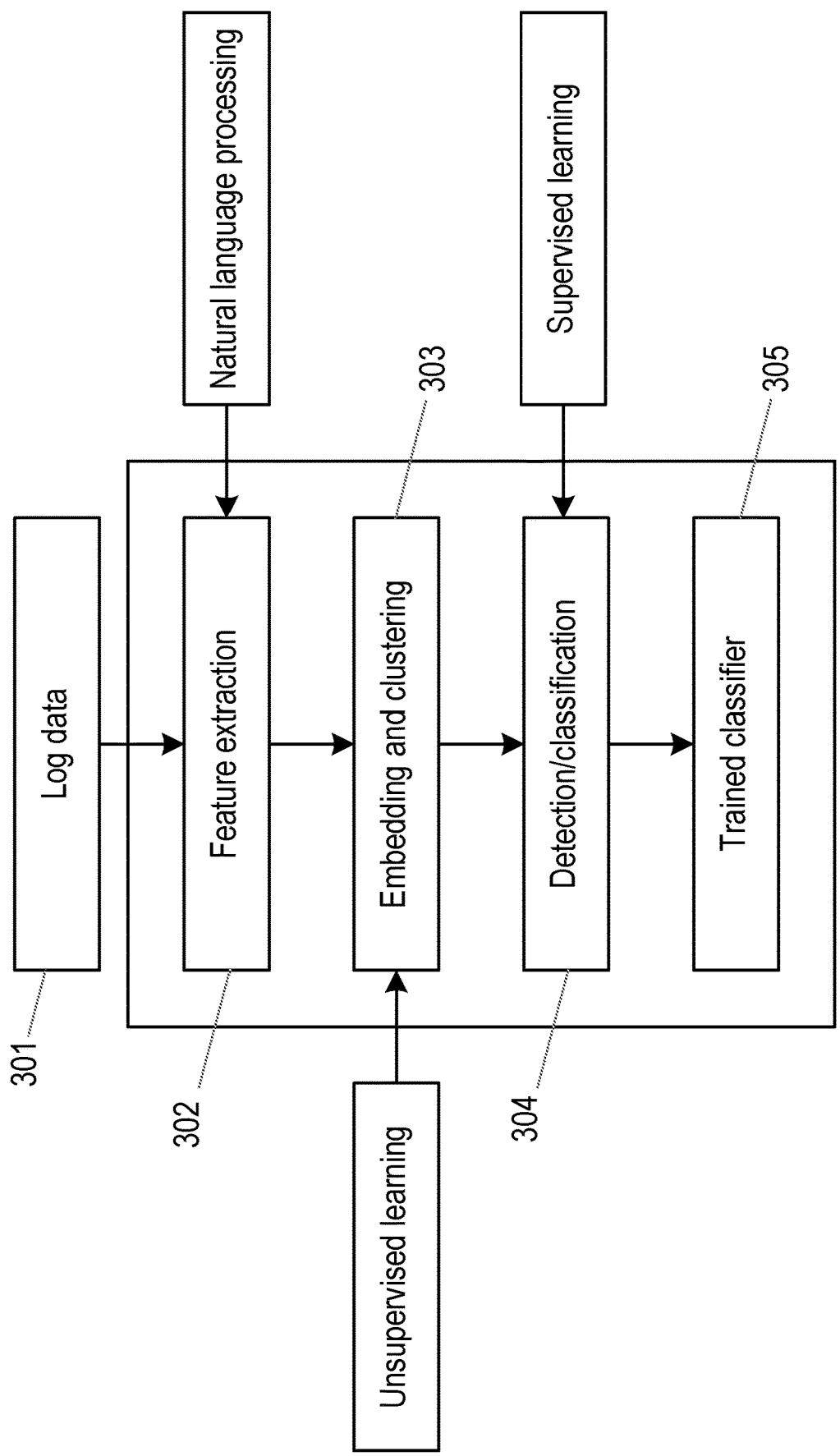
FIG. 3 is a flow chart illustrating a method of training a classifier model using log data.

FIG. 3 outlines the method of training a classifier model using log data 301. The log data 301 includes log data for one or more UEs. The log data can be obtained from the UEs themselves, and/or from the network nodes serving the UEs. Typically, log data will relate to, and be obtained from, many UEs and many network nodes. The network nodes and UEs may be operating according to LTE and/or 5G (NR). The log data 301 is first parsed and combined based on time alignment.

In step 302 the content of the log data is then split into textual information ('textual elements') and numerical information ('numerical elements'), e.g. measurement indicators. The measurement indicators may be from the UE, network logical serving cells provided by a base station and/or neighbour cells. In step 302 a natural language processing technique can be applied to the textual data to transform the textual data into multi-dimensional features (i.e. the textual data is transformed into vectors). At the same time, the numerical data is scaled and transformed into a 2-dimensional array (i.e. the numerical data is transformed into vectors). Step 302 is referred to as 'feature extraction'.

In step 303 an unsupervised embedding and clustering procedure is performed on the textual vectors and the numerical vectors to learn the model parameters end-to-end. Embedding is a technique used to characterise and condense input data with a high number of dimensions into a lower-dimensional format.

Then, in step 304, a supervised learning process is performed, for example using a multi-task learning neural network, to build a trained classifier model 305.

Some specific examples of log data 301 are provided below. As noted above, the log data 301 is first parsed and combined based on time alignment. This operation combines the log data from the different sources, e.g. UEs and/or network nodes, and aligns the log events within the log data so that a more complete view of the operation of the system can be obtained. Thus the log data from UEs is combined with the signalling traces extracted from network nodes.

Data extracted from network nodes can include UE Traffic Recording (UETR), Cell Trace Record (CTR), General Performance Event Handling (GPEH), and 3GPP Layer 3 (L3) event messages. This data may be in separate logs, either within the same network node or obtained from several network nodes, and so the log data needs to be combined. In this case, the log events in the different log data should be aligned in time and the UE contexts (i.e. specific UEs) identified and/or selected.

From UEs, log events can include RRC and/or NAS layer signalling messages, and physical layer measurement recording messages such as serving and neighbour cell Reference Signal Received Power (RSRP), etc. Some exemplary signalling events are shown below:

---

{Signaling events: {
 {RRC: NR->MeasurementReport, NR->RRCReconfiguration, . },
 {NAS: NR->Authentication request, NR->Registration reques, .}
 }
 Physical Measurement:{ {ServingCell: SS-RSRP, SS-
 SINR, . }, {NeighborCell: 1st NR RSRP, 2nd NR RSRP, 3rd NR
 RSRP, .}, {Others: NR WB CQI, NR PUSCH TxPower, .}
 }
 }
}

---

From the access network nodes, the log events can include signalling messages such as RRC, S1, X2 messages and equipment node internal event messages. Some exemplary signalling events are shown below:

---

{Signaling events: {
{RRC: NR->MeasurementReport, NR->RRCReconfiguration, . },
{S1: S1_ERAB_MODIFY_REQUEST, S1_ERAB_MODIFY_RESPONSE,
S1_ERAB_RELEASE_COMMAND, . },
{X2: X2_HANDOVER_CANCEL, X2_HANDOVER_PREPARATION_FAILURE, .}
}
Internal events:{
{INTERNAL_EVENT: INTERNAL_EVENT_ADMISSION_BLOCKING_STARTED,
INTERNAL_EVENT_ADMISSION_BLOCKING_STOPPED, .}
}
}

---

Furthermore, the log data can include signalling data from the circuit-switched core or packet Internet Protocol (IP) captured at a network interface such as S1, S11, $SG_s$, $G_n$. The inclusion of such log data can enhance the feature learning in the algorithm.

Figure 4:
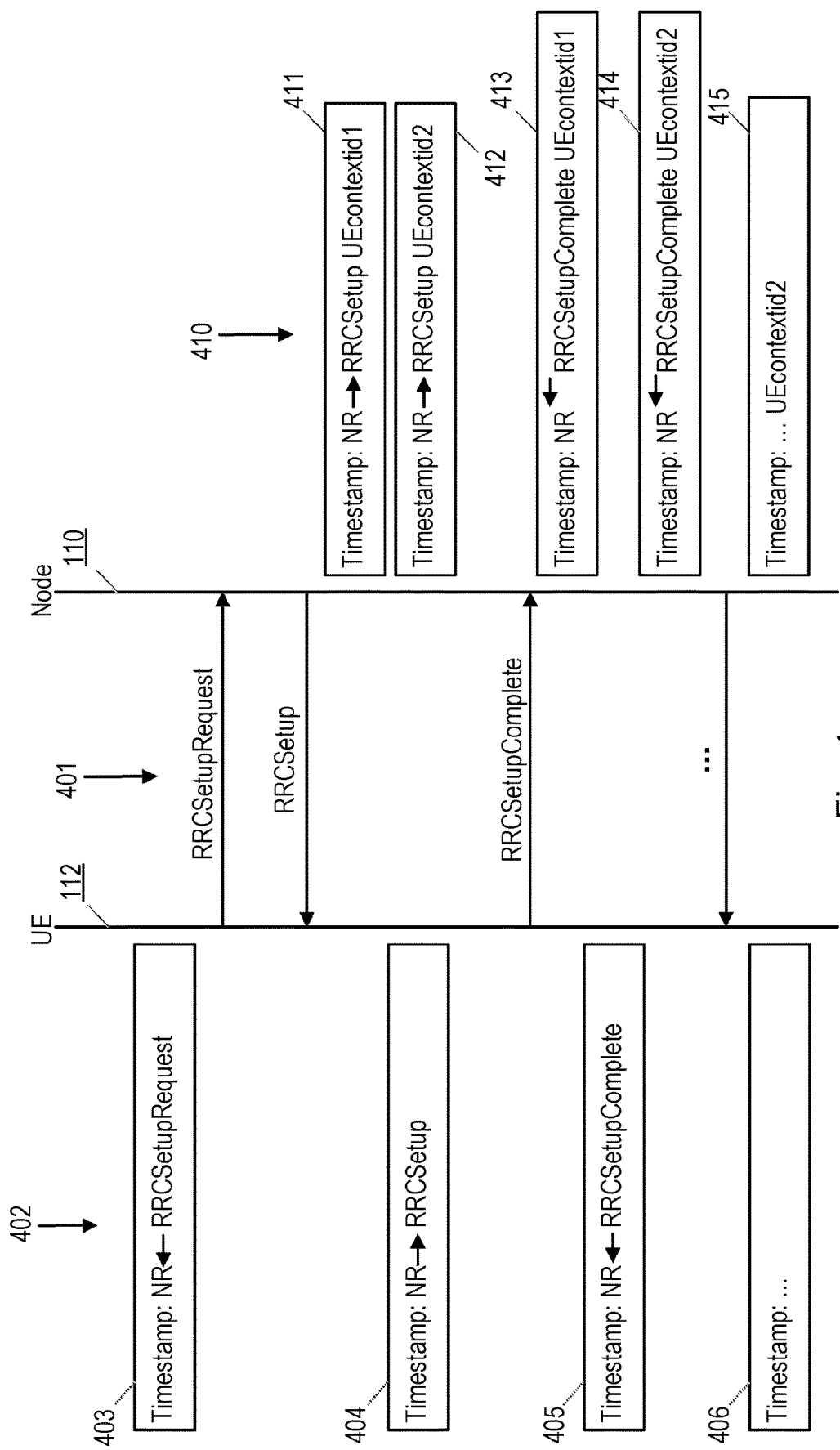
FIG. 4 is a diagram illustrating time and device context synchronisation.

FIG. 4 is a diagram illustrating time and device context synchronisation of log events in log data from a first UE 112 and an access network node 110, with the log data from the access network node 110 including log events relating to multiple UEs 112. FIG. 4 shows a signalling process 401 between the first UE 112 and the access network node 110. The signalling process 401 involves RRC signalling. FIG. 4 shows the first UE's log data 402 relating to the RRC signalling 401, and the log data 402 includes a number of log events 403-406 relating to individual signals in the RRC signalling 401. Thus, there is a log event 403 indicating that the first UE sent an RRCSetupRequest to the network. The log event 403 includes a timestamp indicating when the RRCSetupRequest was sent, or when that event was logged. Log events 404, 405, 406 relate to other signalling exchanged in the RRC signalling process 401.

FIG. 4 shows the access network node's log data 410 relating to the RRC signalling 401 with the first UE 112, and also to RRC signalling processes with other UEs. Thus, the log data 410 includes a number of log events 411-415 relating to individual signals in the RRC signalling 401 and to signals in RRC signalling with another UE. Thus, there is a log event 411 indicating that the first UE sent an RRC-SetupRequest to the network. This log event 411 includes a timestamp indicating when the RRCSetupRequest was sent, or when that event was logged, and also includes an identifier or context identity for the first UE 112. This identifier for the first UE 112 is 'UEcontextid1'. Log event 412 relates to the receipt of a similar RRC signal from another UE, and that UE has identifier or context identity 'UEcontextid2'. Log events 413-415 relate to other signalling exchanged in the RRC signalling process 401 and the RRC signalling process with the UE with identifier 'UEcontextid2'.

So, the log data will include the log data 402 from the first UE 112 and the log data 410 from the access network node 110. This log data is combined, with the log events in the log data being synchronised in time, i.e. based on the timestamps associated with each log event, and synchronised by UE identifiers (i.e. by UEcontextid). At this pre-processing log data stage, the timestamps recorded in the UE log 402 and the network node log 410 should be calibrated and/or offset, for example to account for any time zone difference. The alignment can include a preliminary check on the first few initial exchanges of signalling between the UE 112 and the network node 110. The preliminary check can be used, for example, to compare the embedded message contents of log event 404 and log events 411, 412. Log events 411 and 412 include all RRCSetup messages from the access network node 110 in a short time window nearest to log event 404 (so there are only a few messages to be taken into account in the comparison/check). For example, if the contents of log event 411 are the same as log event 404, log event 411 can be considered to be the counterpart message of UE 112 in the access network node 110.

Once the appropriate identifier/context identity has been confirmed for a UE 112, the subsequent signalling in the log data can be merged according to time sequence for the specific device contextid. That is, the log data can be separated by UE 112, i.e. by identifier/context identity.

The flow charts in FIGS. 5-10 show various steps of FIG. 3 in more detail. The following terminology is used in the description of FIGS. 5-10:

TABLE 1

| Symbol | Definition | Remark |
|---|---|---|
| L | log data | |
| N | number of log messages available in L | |
| E | set of log events | |
| M | number of log events | |
| ES | set of event sequences | |
| J | number of measurement indicators | |
| K | set of J number of measurement indicator sequence | |
| W | window size - determines the length of a log sequence within a session | |
| O | overlapping size - determines the length of a common log sequence between 2 sessions | |
| $m_i$ | the i th log message | $m_i \in L, 1 \leq i \leq N$ |
| $k_i$ | measurements indicators at instance i, | $k_i \in L, k = \langle k_1, k_2, \ldots, k_n \rangle$, $1 \leq i \leq N$ |
| $p(\cdot)$ | mapping function of event extraction | |
| $p(m_i)$ | signalling event of log message $m_i$ | $e_i = p(m_i)$ |
| $es_i, ks_i$ | the ith signalling event sequence, measurements indicators sequence | $[p(m_{iW-O+1}), p(m_{iW-O+2}), \ldots, p(m_{iW-O+W})]$ $[k_{iW-O+1}, k_{iW-O+2}, \ldots, k_{iW-O+W}]$ |
| $v(e_i)$ | vector of log event $e_i$ | $e_i \in ES$ |
| $v(k_i)$ | vector of indicators $k_i$ | $k = \langle k_1, k_2, \ldots, k_n \rangle$ |
| $f(es_i, ks_i)$ | prediction of log sequence $es_i, ks_i$ | $f(v(es_i), v(ks_i))$ |
| $y_i$ | label of log sequence $es_i, ks_i$ | |

Figure 5:
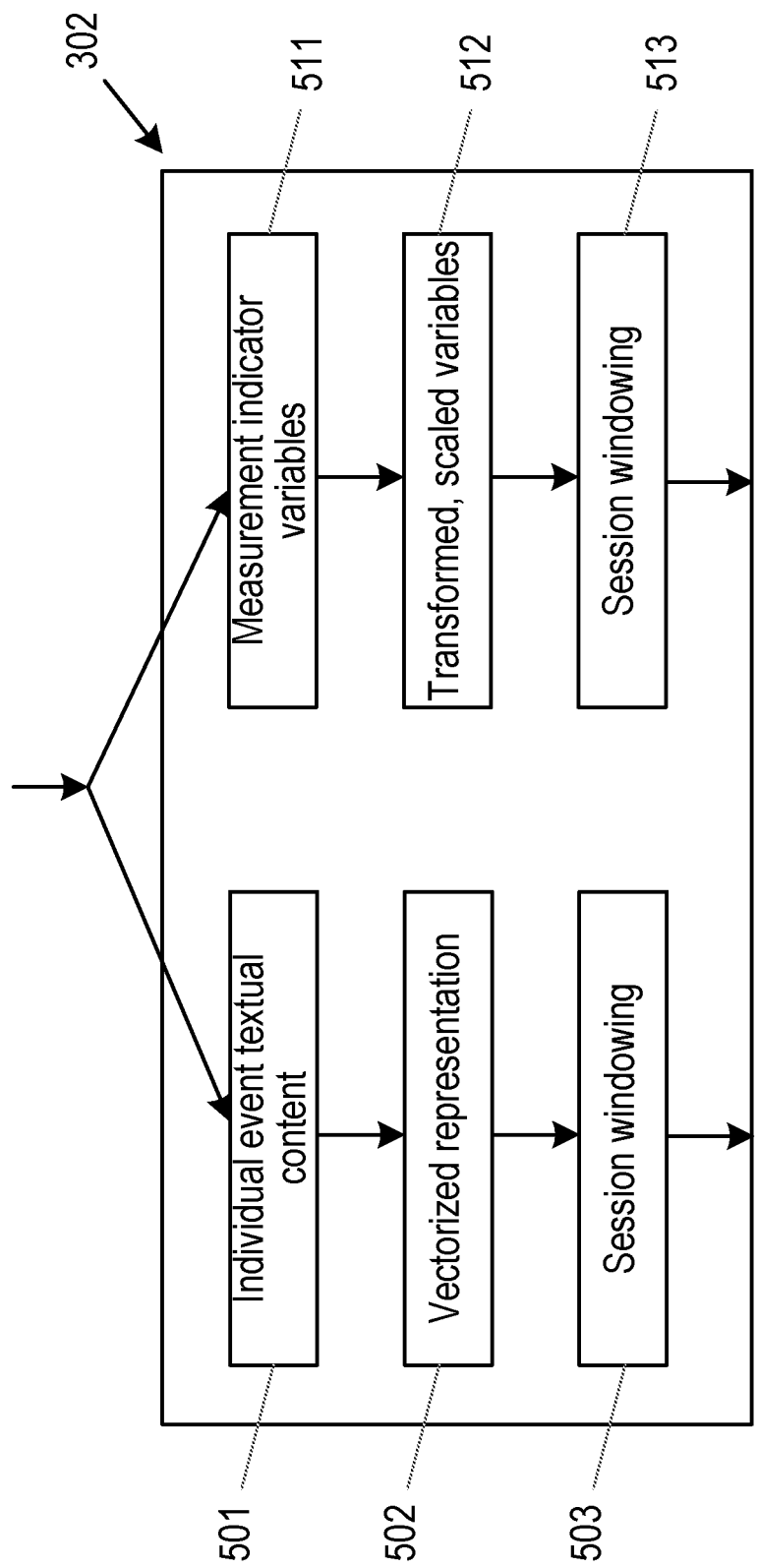
FIG. 5 is a flow chart illustrating step 302 of FIG. 3 in more detail.

The flow chart in FIG. 5 shows the feature extraction of step 302 in more detail. In the feature extraction step 302 the log data 301 is separated into textual and numerical information. A particular log event can comprise only textual information, only numerical information, or both textual and numerical information. Thus, the textual elements $m_i$ of the log data 301 are extracted in step 501, mapped to a signalling event, denoted by $p(m_i)$, and further processed in steps 502 and 503. The numerical elements represented by the measurement metrics in the log data 301, which quantify the radio environment at an instance ith for an indicator j, denoted by $k_{ij}$, are extracted in step 511, and processed in steps 512 and 513.

In step 502, the extracted textual elements are vectorised, i.e. transformed into vector representations by mapping the textual elements to a vector space. This results in respective textual element vectors for the extracted textual elements.

Similarly, in step 512, the extracted numerical elements are vectorised, i.e. transformed into vector representations by mapping the numerical elements to a vector space. This results in respective numerical element vectors for the extracted numerical elements. As the numerical elements may not be directly comparable, e.g. they use different units of measurement, have different offsets and/or are measured against different scales, step 512 can comprise scaling and/or normalising one or more of the numerical elements so that they can be compared to each other.

Thus, in steps 502 and 512 the textual and numerical input data are transformed into vector representations.

In steps 503 and 513, the textual element vectors and the numerical element vectors are divided into sessions for particular UEs. A session for a particular UE may include all of the textual element vectors (or all of the numerical element vectors) for a particular UE, or a session can relate to a subset of the textual element vectors (or subset of the numerical element vectors) for a particular UE. In the latter case, there can be a number of sessions for a particular UE, each relating to a respective time window or subset of vectors. If it is assumed that there are N log messages/events in the log data, L, the log data can be divided into N/(W-O) sessions. A sequence of log events within a sliding window, denoted by W can be created to form a session $es_i$ and $ks_i$.

Figure 6:
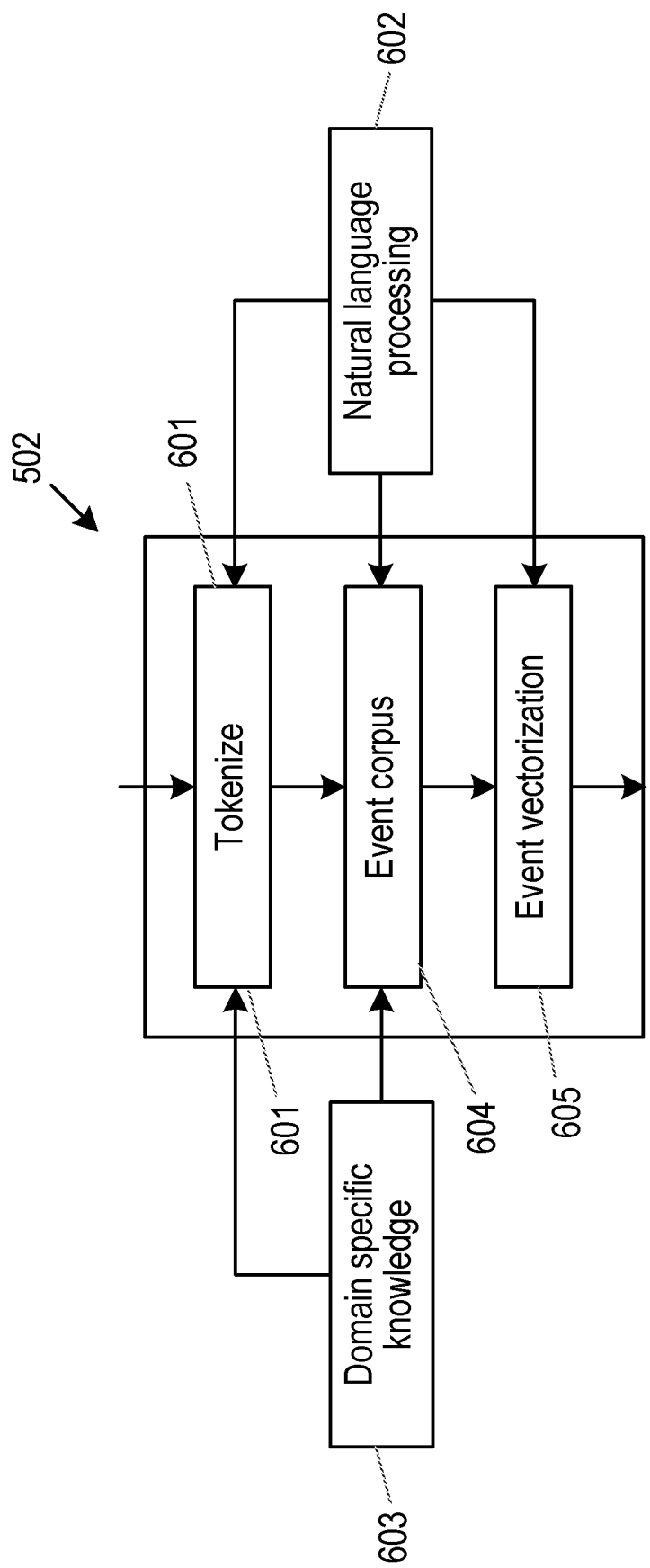
FIG. 6 is a flow chart illustrating step 502 of FIG. 5 in more detail.

The flow chart in FIG. 6 illustrates step 502 (the transformation of textual elements into a vector space) in more detail. Briefly, the textual elements identified in step 501 are encoded to a vector space with a natural language processing (NLP) method, for example using a mapping function such as the word2vec technique described in the paper "Distributed representations of words and phrases and their compositionality" referenced above.

Firstly, in step 601, the textual elements relating to logged events are split into smaller parts. That is, each textual element is analysed and split into several smaller parts, each comprising one or more words, parts of words, or phrases. This is known as tokenisation. The tokenisation 601 can be performed using NLP techniques 602. In some embodiments, the tokenisation process 601 can be performed using standard NLP processes 602, but preferably, due to the large variations of text in vocabulary and format in the radio network domain, the tokenisation process 601 can be enhanced by incorporating knowledge 603 about the radio system. This knowledge 603 can comprise information about the types of textual information that could be included in log data, such as the names of signalling messages, metrics, parameters or specific events that can occur, etc. The enhanced tokenisation process 601 can maintain different log entities such as metric name, parameter and event name. If a generic NLP model is applied (i.e. without domain specific knowledge 603), words such as NR—>CellGroupConfige and nzp-CSI-RS-ResourceToAddModList may become NR, CellGroupConfige, nzp, CSI, RS, ResourceToAddModList, which means the domain-specific meaning of these terms is lost.

In step 604, a text corpus is determined based on the tokenised textual elements. The text corpus/event corpus, i.e. the 'dictionary' of the words/phrases/terms used in log events, will be built up as the process in FIG. 6 is performed for many different log events. Again, step 604 can be performed using standard NLP techniques 602, but in preferred embodiments radio system knowledge 603 can be used to enhance the formation of the text corpus.

Finally, in step 605, the tokenised textual elements are projected into a vector space to determine a vector for each textual element. This projection into vector space can be performed by the word2vec model.

Figure 7:
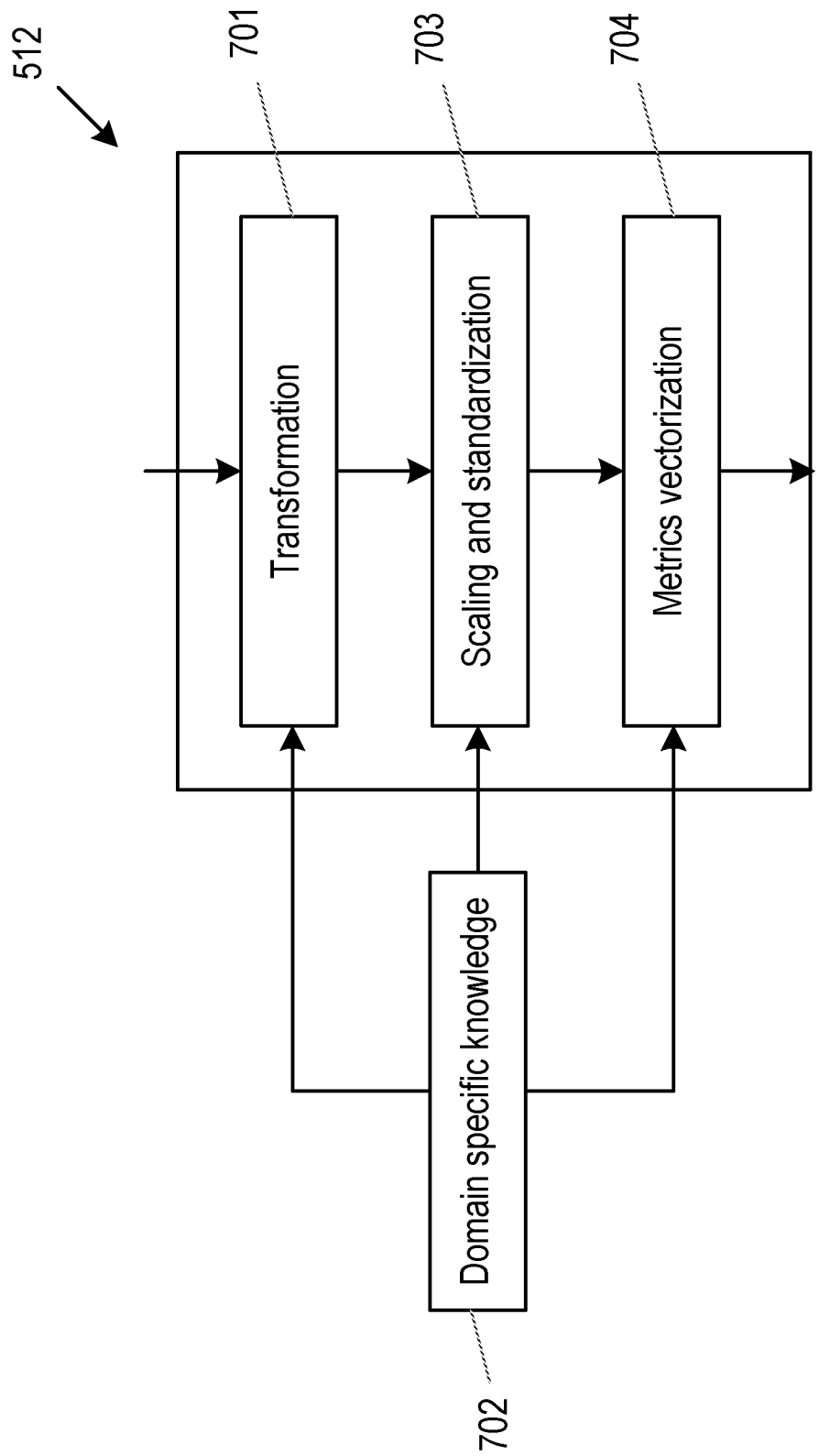
FIG. 7 is a flow chart illustrating step 512 of FIG. 5 in more detail.

The flow chart in FIG. 7 illustrates step 512 (the transformation of numerical elements into a vector space) in more detail. Network metrics often contain large variations of units and in value range. The numerical data should be standardised across different metric units and variable ranges, and this is achieved in FIG. 7. In step 701, where numerical elements are in a coded format (e.g. a 3GPP coded format), the numerical elements are transformed to a data range that can be understood/interpreted by network engineers. Domain network knowledge 702 can be used to improve the transformation in step 701.

In step 703 the transformed numerical elements are scaled and/or standardised. That is, the transformed numerical elements are scaled and/or converted to a standardised measurement unit so that they can be more directly compared to each other. Again, domain specific knowledge 702 can be applied to step 703 to improve the scaling and/or normalisation. The domain specific knowledge 702 can indicate, for example, suitable measurement units (e.g. decibel-milliwatts, dBm, kilobits per second, kbps, etc.), and/or a suitable scaling maximum and/or minimum value for different metric units.

In step 704, the output of the scaling and standardisation step 703 is then projected into a vector space to determine a numerical vector for each numerical element. This results in a standardised numerical element vector associated with each log event. Thus, step 704 comprises merging standardised individual metric values into a more compact vector form.

Figure 8:
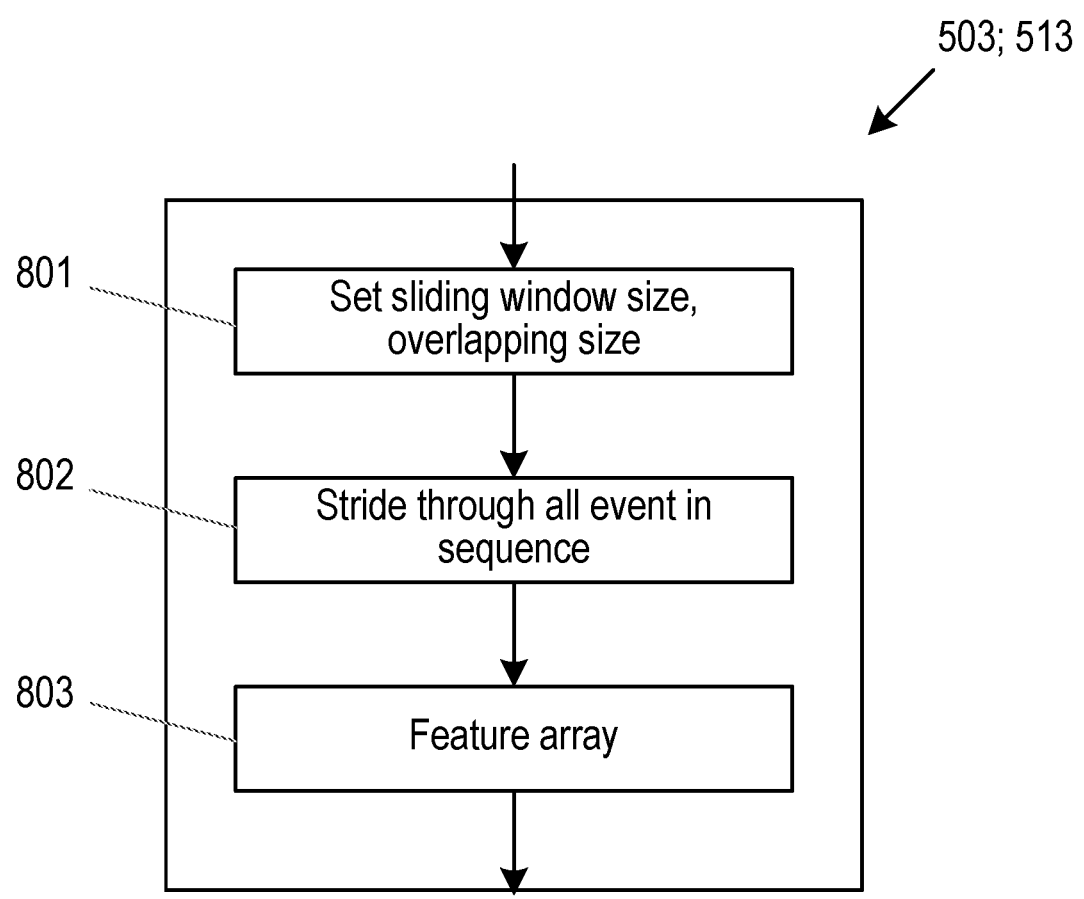
FIG. 8 is a flow chart illustrating steps 503 and 513 of FIG. 5 in more detail.

The flow chart in FIG. 8 illustrates the 'session windowing' steps 503 and 513 in FIG. 5 in more detail. As noted above, in steps 503 and 513, the textual element vectors and the numerical element vectors are divided into one or more sessions for particular UEs. In step 801 a parameter W that represents a "sliding window size" or "session window size" is set. This parameter determines the length of a session for a UE, and the length can be given by a time window covered by the log events, or a number of textual/numerical element vectors to include in each session. In step 801 another parameter O can be set which determines the amount of overlap between sessions, with the overlap represented in terms of an amount of overlap measured in time, or a number of element vectors that can be common to consecutive sessions.

In step 802 the window of length W is slid over the respective sequence of element vectors to select the element vectors for a UE session. A session determined from a particular window position will typically relate to a subset of the textual element vectors (or subset of the numerical element vectors) for a particular UE.

Thus, in step 802 the window is slid over all the element vectors in sequence to obtain N/(W−O) sessions, which is denoted by [f(es$_0$), f(es$_1$), . . . f(es$_{N/(W-O)}$)] and [v(ks$_0$), v(ks$_1$), . . . , v(ks$_{N/(W-O)}$)].

The element vectors for each session can be output in step 803. The element vectors for a session can be output individually, but in some embodiments, the element vectors for a session can be output as a feature array. A feature array is an array or matrix formed from the element vectors within the session window.

Figure 9:
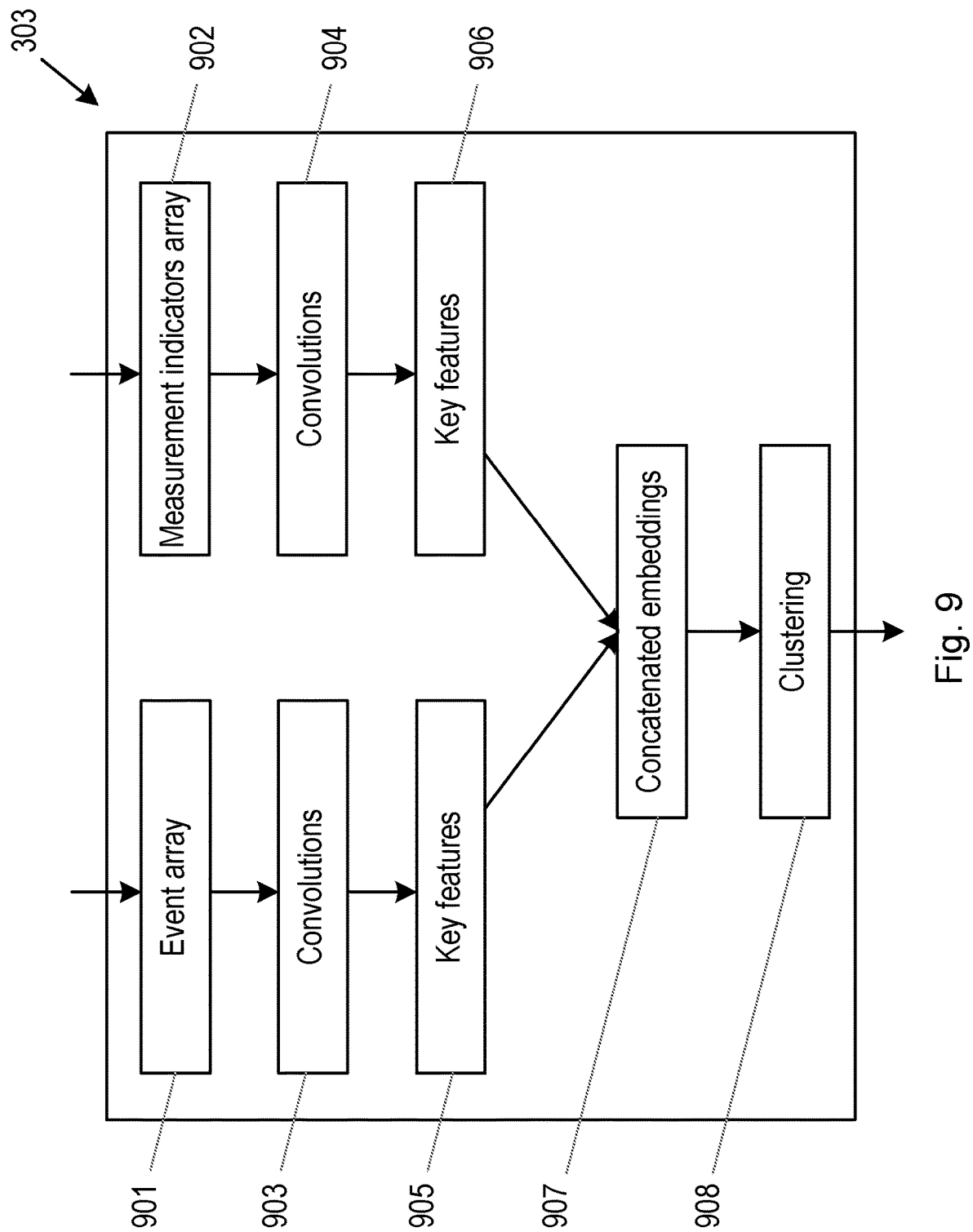
FIG. 9 is a flow chart illustrating step 303 of FIG. 3 in more detail.

FIG. 9 illustrates the embedding and clustering step 303 in FIG. 3 in more detail. The embedding and clustering is performed per UE session, and so the inputs to step 303 are the set of textual element vectors for a UE session (referred to generally as the 'event array' 901 (the feature array 803 formed from the windowed textual element vectors)) and the corresponding set of numerical element vectors for a UE session (referred to generally as the 'measurement indicators array' 902 (the feature array 803 formed from the windowed numerical element vectors)). The sets/arrays 901, 902 are corresponding in the sense that they relate to the same UE (i.e. same UE context) and the same 'session' (i.e. same time period and/or same signalling process). The event array 901 and the measurement indicators array 902 are input to respective branches of the embedding process. These branches operate to separately perform embedding, i.e. feature learning (i.e. learning or deriving the features that are important or key for representing the input array 901, 902). These embedding steps are represented by convolution steps 903, 904 respectively, and the key features resulting from the embedding steps are shown as steps 905, 906 respectively.

The features 905, 906 from each branch are combined/concatenated in step 907 and a further embedding is performed to learn the important features of the combined data. The output of step 907 is a single embedding representing the two input arrays 901, 902, and thus representing a particular UE session. Steps 901-907 therefore jointly learns shared weights of the arrays 901, 902 and a shared feature representation.

Once steps 901-907 have been performed for a number of different UE sessions (for the same UE and for multiple other UEs), a clustering analysis can be performed in step 908 to determine groupings or clusters of UE sessions.

Thus, the method in FIG. 9 provides for multi-input feature learning, with event array 901 f(es$_i$) and measurement indicator array 902 v(ks$_i$) being fed in parallel into the algorithm, followed by a clustering of the concatenated embeddings from step 907. This process is an unsupervised learning technique.

The embedding process in steps 903-907 results in a 'loss' of data, as does the clustering in step 908, and in some embodiments the method in FIG. 9 can be performed to jointly optimise the embedding and clustering, thereby jointly minimising the loss of the embedding and clustering. Jointly optimising the embedding and clustering can be achieved by iteratively adjusting the embedding process and the clustering process.

The output from the clustering step 908 is an optimised vector/array embedding and identity of a cluster to which each UE session is associated.

Figure 10:
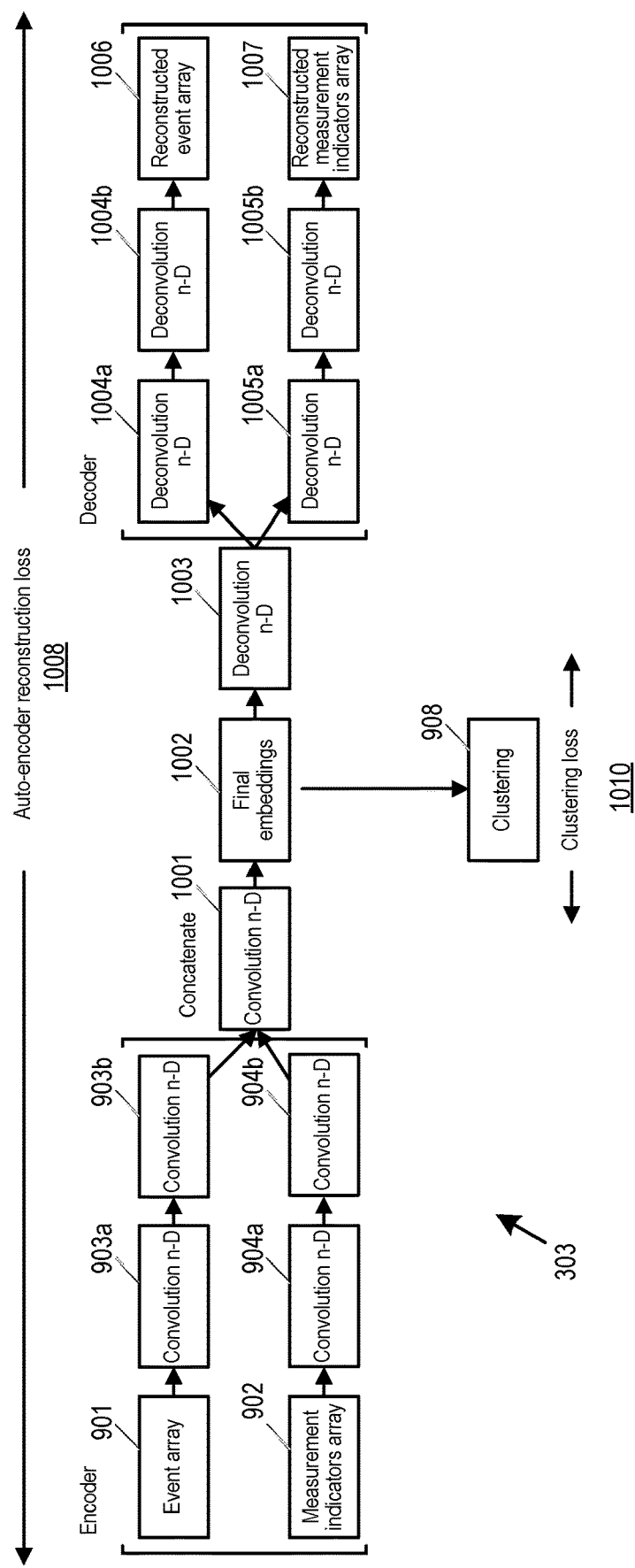
FIG. 10 is a block diagram illustrating the use of an auto-encoder in step 303 of FIG. 3.

The block diagram in FIG. 10 illustrates an exemplary implementation of the embedding and clustering process from FIG. 9. In this example, the embedding is performed using a multi-input auto-encoder architecture, which is also referred to as a multi-task auto-encoder. The auto-encoder is used to learn the latent embeddings of the input arrays. The multi-input auto-encoder can be any suitable type, for example a deep multi-perceptron auto-encoder, or a convolutional auto-encoder (either 1-dimensional or 2-dimensional).

The textual element vector array 901 (event array) and numerical element vector array 902 (measurement indicators array) are input separately into respective branches of the multi-task auto-encoder. Along each branch, the arrays pass through one or more neural network layers (e.g. two, as shown in FIG. 10) that reduce the number of dimensions in the arrays. This is represented by the convolution blocks 903*a* and 903*b* on the event array 901 branch, and the convolution blocks 904*a* and 904*b* on the measurement indicators array 902 branch. The reduced-dimensionality (i.e. embedded) arrays are concatenated and a further neural network layer is used to reduce the dimensions of the concatenated array. This is shown by convolution block 1001, that produces a final embedding 1002 for the input event array 901 and measurement indicators array 902. The dimensionality (i.e. number of dimensions) in the final embedding 1002 can be configurable.

As part of the auto-encoding process, the final embeddings 1002 are processed to reconstruct the event array 901 and the measurement indicators array 902. Thus, the final embeddings 1002 pass through a neural network layer 1003 that performs a deconvolution on the final embeddings 1002. The de-convoluted final embedding is then separated (i.e. de-concatenated) into separate branches for the textual element vector array and the numerical element vector array. Each of the arrays pass through one or more neural network layers (e.g. two, as shown in FIG. 10) that perform deconvolution operations on the respective arrays to increase (i.e. restore) dimensionality to the arrays. This is represented by the deconvolution blocks 1004*a* and 1004*b* on the event array 901 branch, and the deconvolution blocks 1005*a* and 1005*b* blocks on the measurement indicators array 902 branch. These deconvolution operations result in a reconstructed event array 1006 and a reconstructed measurement indicators array 1007.

By comparing the input arrays 901, 902 to the respective reconstructed arrays 1006, 1007, an auto-encoder reconstruction loss 1008 can be determined. The auto-encoder reconstruction loss 1008 represents a measure of the difference between the encoded (textual and numeric) array 1002 and the decoded arrays 1006, 1007, to find the low dimension embedding latent space. Thus, the auto-encoder reconstruction loss 1008 can be calculated based on the inputs and outputs of the auto-encoder model. The calculation of the auto-encoder reconstruction loss 1008 will go through two input branches and a common layer after merging, that is, the entire neural network architecture.

The final embeddings 1002 are then input to a clustering block 908 so that the final embeddings can be grouped or clustered. The clustering process in block 908 is associated with a clustering loss 1010. The clustering loss 1010 refers to a sum of the squares of variables of connected sample points in the final embedding space. A sample point is a point representing an embedded array. A larger clustering loss/error means a greater difference between connected points, which usually indicates a poor performance for the clustering. A mutual k-nearest neighbour (M k-NN) criterion can be used to determine which samples are connected.

An important feature of the auto-encoder and clustering process in FIG. 10 (and FIG. 9), is that the weighting of the neural network multi-task auto-encoder architecture is learned end-to-end, i.e. from the input arrays 901, 902 to the clustering. The auto-encoder reconstruction loss 1008 and the clustering loss 1010 can be jointly minimised.

In some embodiments, the clustering of the final embeddings 1002 is performed in step 908 at the same time as the dimensionality reduction in the convolution steps 903, 904, 1001. Performing the clustering and dimensionality reduction jointly is beneficial because it brings out the latent cluster structure when compared to a separate embedding and clustering approach.

As noted above, in the case of multiple inputs of different types (i.e. the arrays 901, 902) to the auto-encoder, the multi-input auto-encoder firstly encodes the input independently (via convolutions 903*a*, 903*b* and 904*a*, 904*b*) and then merges the multiple encodings. This approach can effectively alleviate the impact of a high-variation input branch dominating the weight learning, and make the single final low-dimension embedding space more representative compared to conventional approaches that use separate dimensionality reduction methods.

In some embodiments, prior knowledge of the input branch can be taken into account when determining the model parameters of the final embeddings 1002 by providing different bias for each input branch in the final embedding 1002. The bias of each input branch can be configurable. With such an approach the bias can be taken into account when calculating the auto-encoder reconstruction loss 1008 during the model training phase, which provides greater flexibility to fine-tune clustering preferences. For example, when two inputs are considered, e.g. a textual element vector array 901 and a numerical element vector array 902, the bias parameter can be set 0.8:0.2 respectively. That is, the multi-input auto-encoder reconstruction loss L can be given by $L=0.8 \times L_{text}+0.2 \times L_{metrics}$, where $L_{text}$ is the loss for the textual element vector array 901 branch and $L_{metrics}$ is the loss for the numerical element vector array 902 branch.

Thus, the auto-encoder shown in FIG. 10 is used to compress the input arrays 901, 902 to a lower dimension space. The use of a multi-input auto-encoder is advantageous as it allows all the tasks share the same encoding and decoding weights, and the shared features of related inputs can be learnt to find their latent representations (embeddings). Compared to other methods of dimensionality reduction, such as principal components analysis (PCA), PCA would need to be applied independently for each type of input data array, and each lower dimensional array would need to be concatenated before clustering. With this PCA approach, the relevancy of the two input data arrays would be lost in the final lower dimensional feature set. Thus, the use of a multi-input auto-encoder is preferred.

Once the embedding and clustering are optimised, the output of step 303 will be an indication of a cluster to which each of the UE sessions relates. Each cluster can have a respective identity $y_i$. As noted above, a UE session will be represented by a final embedding 1002 of the set of textual element vectors (event array 901) for the UE session and the set of numerical element vectors (measurement indicators array 902) for the UE session.

FIG. 11 is a graph illustrating exemplary clusters obtained using the method described above to embed the log data in 3-dimensional space. Each data point in the graph represents a UE session. Typically, the embedding and clustering will result in clusters of sessions that exhibit similar signalling events and/or indicator metrics.

The clusters of UE sessions can be evaluated by a domain expert, e.g. a network engineer, to determine the status of the communication network and/or wireless devices associated with each cluster. The expert can review the underlying session data, e.g. the original log data for each session to determine the appropriate network status. Different clusters can be associated with a different network status. For example, one or more clusters may relate to correct operation of the communication network/wireless devices, and the network status can be determined as such. However, one or more clusters can relate to failures in the network, and the network engineer can evaluate the log data to determine the type of failure and/or a cause of the failure. For example, failures can include disconnections, high packet loss, low signal quality, etc.

Training data for the classifier model is formed from the clusters and the associated network status determined by the network engineer or other expert. The classifier model can then be trained to determine network status from log data using this training data. The training can be performed using a general supervised learning method, such as a neural network.

Once trained, newly collected log data can be evaluated by the trained classifier model to determine the network status associated with the log data. In the event that a failure has occurred, the network status output by the trained classifier model following an evaluation of the relevant log data can inform a network engineer of the type or cause of the fault that has occurred. In some embodiments, where a failure is detected by the classifier model, the system can output the log data for the session that suffered the failure for evaluation by a network engineer.

FIG. 12(a) shows exemplary log data comprising signalling messages and metrics for a cluster that relates to a handover issue. From inspecting the log data in FIG. 12(a), it can be seen that the radio frequency signal quality is poor (NR PCI 750) before handover execution. The UE detects 5 or 6 serving cell signals at the same time. The first neighbouring cell signal strength is higher than the serving cell (before handover execution). Repetitive RRCReconfigurationComplete signals are sent from the UE to the network within a short time window. Thus, in this case the UE is being switched from one service cell to another due to a lack of a dominant serving cell, and the pilot signal is constantly interfered by signals from neighbouring cells.

FIG. 12(b) shows exemplary log data comprising signalling messages and metrics for a cluster that relates to another type of handover issue. In this session, the signalling message "Registration request" happens immediately after the RRCReconfigurationComplete message. The serving cell (NR PCI 197) signal strength (SS-RSRP) and quality (SS-SINR) is poor before handover. The neighbouring cell signal strength is much higher than the serving cell (before handover execution). Also observed is the UE transmit power (TxPower) is almost the maximum capability (20~21 dBm). This phenomenon occurs when the UE is at the radio signal coverage edge. The root cause of the handover failure is the delayed handover in a weak signal strength area. In this case the network engineer can determine a recommended action to speed up the handover execution process by adjusting the handover hysteresis and trigger time parameters. The engineer can determine that a more long-term action required is to improve the weak signal location.

Figure 13:
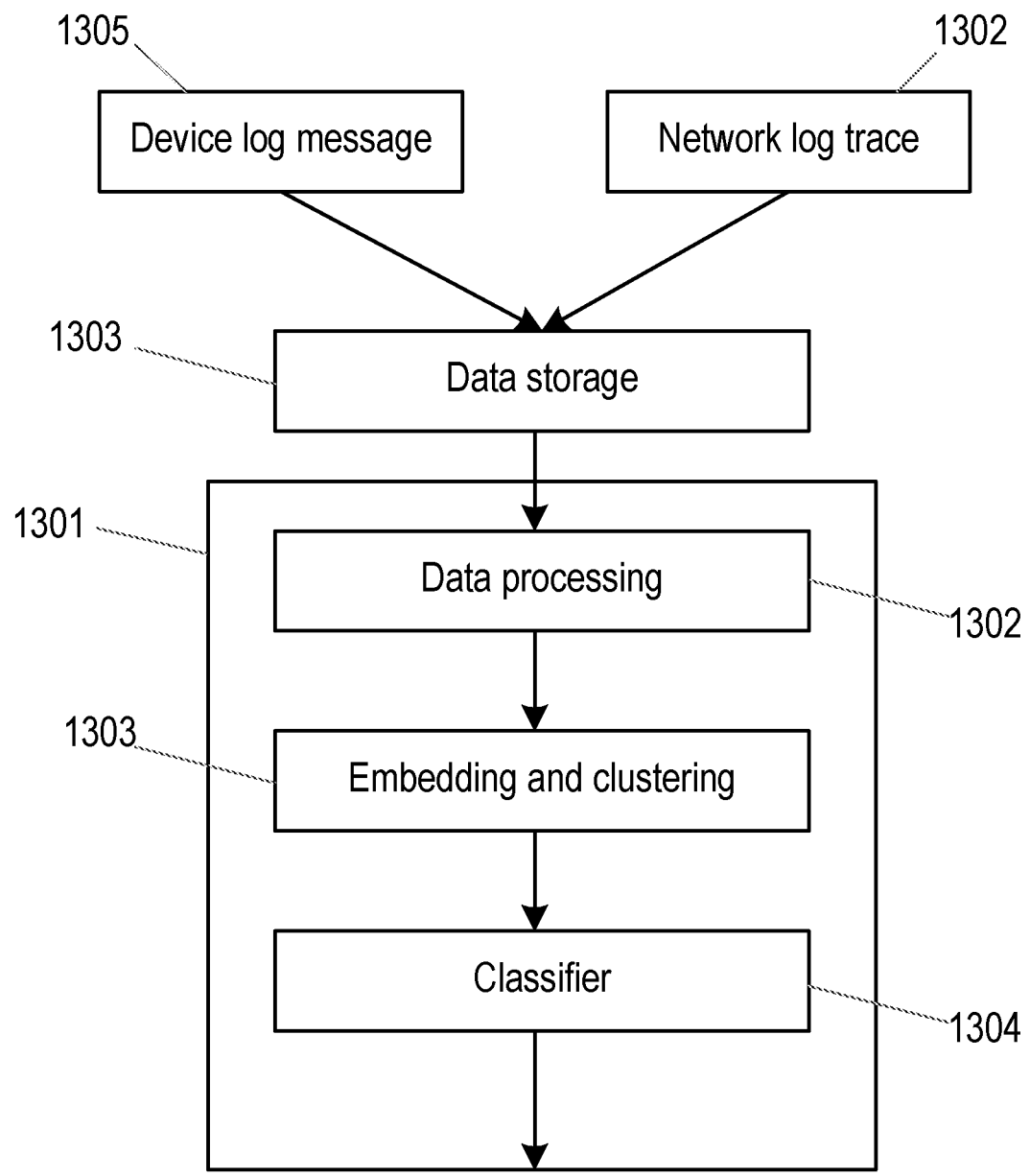
FIG. 13 is a block diagram illustrating the containerisation and deployment of the method of FIG. 3 as one or more virtual functions on a cloud server or other host.

FIG. 13 is a block diagram illustrating the containerisation and deployment of the techniques described herein as one or more virtual functions on a cloud server or other host. In these embodiments, the apparatus 116 can be considered to be a virtual node. The container 1301 comprises virtual functions for data processing/feature extraction 1302, embedding and clustering 1303, and training the classifier model 1304. The wireless device log data 1305 and network node log data 1306 can be stored in data storage module 1307. The container 1301 can access the log data stored in the data storage 1307.

Thus, the techniques described herein provide one or more advantages over conventional log analysis techniques. For example, the techniques provide for the combination of textual elements of a log and any associated numerical elements in the log within a session window (i.e. relating to a particular UE). An optimum embedding can be jointly learned and optimised for the total loss (dimensional reduction/embedding and clustering) via an end-to-end learning process. This can enable the integration of a clustering method in the feature learning pipeline, while requiring little human supervision or labelling. With the embedding process being multi-input, it is possible for information to be input that have different dimensions and/or types, increasing the possibility of relevant domain information being part of the input data. Although two (or more) sources of log data can be input, log data from a UE and network node can be combined before the log data is sub-divided into individual sessions. In some embodiments a NLP process for extracting the textual elements can use an enhanced text tokenisation process which incorporates radio system knowledge; to improve the likelihood that a meaning intended for the communication network domain is preserved.

Figure 14:
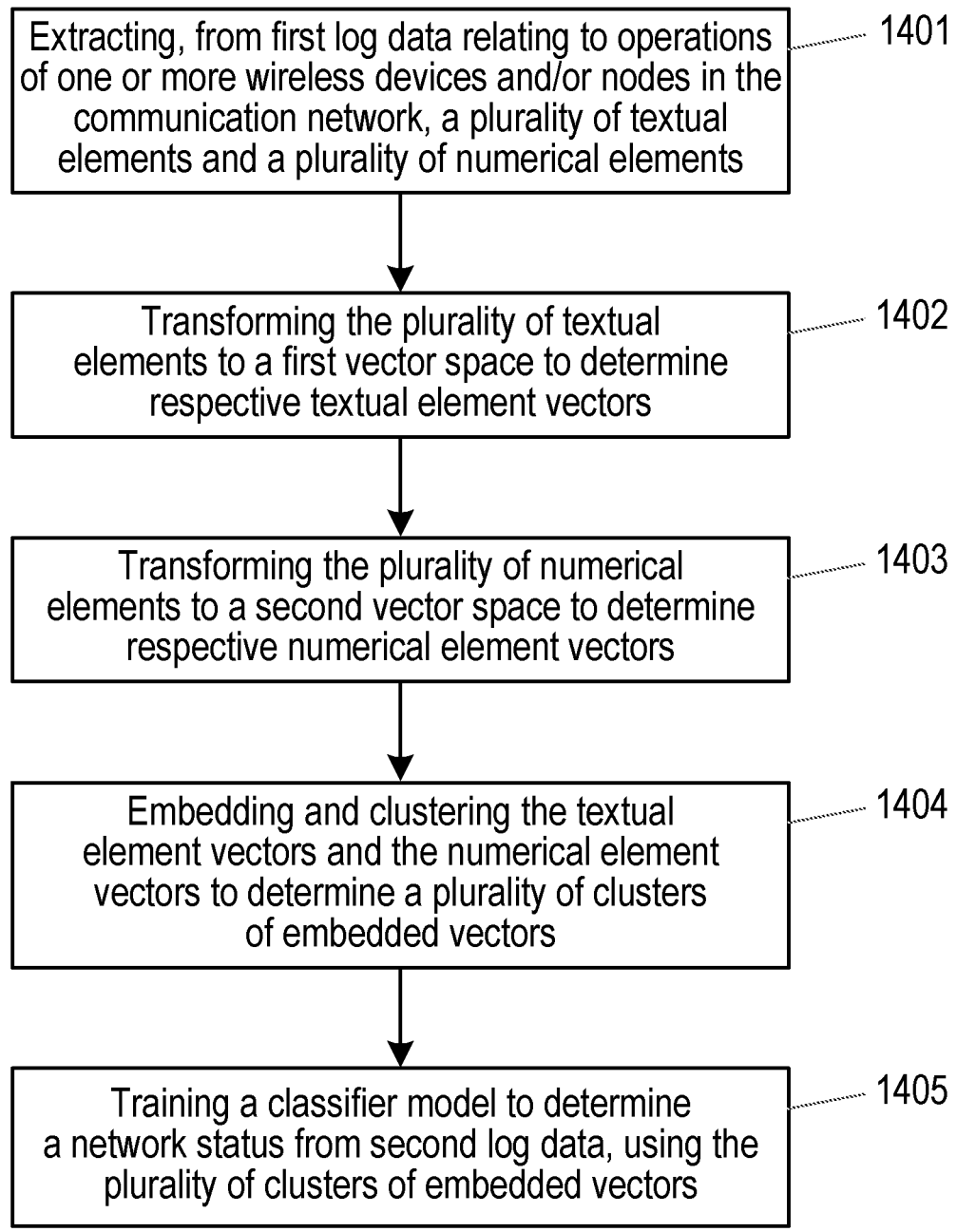
FIG. 14 is a flow chart illustrating a method of training a classifier model.

FIG. 14 is a flow chart illustrating a method performed by an apparatus 116 for training a classifier model to determine a network status of a communication network and/or wireless device(s) from log data. The apparatus 116 may perform the method in response to executing suitably formulated computer readable code. The computer readable code may be embodied or stored on a computer readable medium, such as a memory chip, optical disc, or other storage medium. The computer readable medium may be part of a computer program product.

The method comprises a step 1401 of extracting a plurality of textual elements and a plurality of numerical elements from first log data relating to operations of one or more wireless devices and/or nodes in the communication network. In other words, the textual elements of the log messages are separated from the numerical elements of the log messages. The textual elements may be referred to as a textual value, event session data, event messages, or textual messages. The numerical element may also be referred to as measurement indicators, measurement values, numerical values or numerical session data. The first log data can comprise log events relating to any one or more of RRC signalling messages; NAS layer signalling messages; S1 interface messages; X2 interface messages; physical layer measurements or measurement reports; and signalling traces for the one or more nodes.

In some embodiments, the log data may be received from one or more of the wireless devices and/or from one or more network nodes in the communication network. In these embodiments, the data in the logs from the different devices and/or nodes may be synchronised so that the events in the different logs are in the correct temporal order in the first log data.

In embodiments where the first log data relates to operations of a plurality of wireless devices, the first log data can be evaluated to identify the wireless device or wireless device session to which each element of the first log data relates. As described above with reference to FIG. 4, UE identifiers or UEcontextids included in the log data can be used to identify which wireless device or wireless device session each event in the log data relates to.

In step 1402, textual element vectors are determined by transforming the plurality of textual elements to a first vector space. Step 1402 can be implemented in a similar way to step 502 and FIG. 6 above. Thus, the plurality of textual elements are transformed into a vector representation of the textual elements. In some embodiments, the step of transforming the plurality of textual elements uses NLP, and in some of these embodiments, the NLP may use information specific to the communication network.

In step 1403, which can be performed before, after or at the same time as step 1402, numerical element vectors are determined by transforming the plurality of numerical elements to a second vector space. Step 1403 can be implemented in a similar way to step 512 and FIG. 7 above. Thus, the plurality of numerical elements are transformed into a vector representation of the numerical elements.

As the numerical elements in the first log data may have variations in units and/or in the scales used to represent the numerical values, step 1403 may comprise scaling and/or normalising one or more of the numerical elements with respect to one or more other numerical elements to obtain data that is standardised across different metric units and/or numerical ranges. In some embodiments, radio network knowledge can be used to determine the required scaling and/or normalisation.

After the vectorisation steps 1402 and 1403, the method may comprise a step of determining a plurality of wireless device sessions from the vectorised textual and numerical elements. A wireless device session can comprise a time sequence of at least one textual element vector and at least one numerical element vector relating to a particular wireless device. The duration of a wireless device session may be given by a predetermined session window size. Alternatively, the predetermined session window size can indicate a number of vectors for a wireless device session. In some embodiments, a wireless device session may partially overlap with another wireless device session. The amount of overlap between consecutive sessions may be predetermined.

In step 1404, the textual element vectors and the numerical element vectors are embedded and clustered to determine a plurality of clusters of embedded vectors. The embedding comprises, for a plurality of wireless device sessions, embedding at least one textual element vector and at least one numerical element vector into a single embedded vector representing the particular wireless device session. Step 1404 can be implemented in a similar way to step 303 and FIGS. 9 and/or 10 above. The final embedding 1002 in FIG. 10 is an example of the single embedded vector. A cluster is embedded vectors can represent wireless device sessions for a particular network status. Thus, different clusters can be associated with different network statuses.

In some embodiments, the embedding process and the clustering process of step 1404 are performed iteratively to jointly reduce an embedding loss associated with the embedding and a clustering loss associated with the clustering. In some embodiments, the embedding loss may be calculated as a sum of an embedding loss associated with the numerical element vectors and an embedding loss associated with the textual element vectors. The sum may be a weighted sum, i.e. a bias may be applied to the individual embedding losses.

In some embodiments, the clustering loss is characterised as the sum of the squares of the variables of the connected sample points in the embedding space. A larger clustering error indicates larger difference between connected points, which usually indicate the poor performance of clustering. In some embodiments, the mutual k-nearest neighbour (M k-NN) criterion is used to determine which samples are connected.

In some embodiments, the embedding is performed using an auto-encoder. The auto-encoder may be a deep multi-perceptron auto-encoder, a 1-dimensional convolutional auto-encoder or a 2-dimensional convolutional auto-encoder. In these embodiments, the embedding loss may be a measure of the difference between the encoded (textual and numeric) vectors and the decoded vectors.

In step 1405 a classifier model is trained to determine a network status from second log data. The classifier model is trained using the plurality of clusters of embedded vectors determined in step 1404. In some embodiments, the training data for the classifier model can include the plurality of clusters and a respective network status for the clusters. The network status can comprise or indicate a reason for a failure associated with the wireless device sessions in the cluster. The network status for particular clusters can be provided or indicated by a network engineer from an analysis of the log data relating to the wireless device sessions in the cluster.

Figure 15:
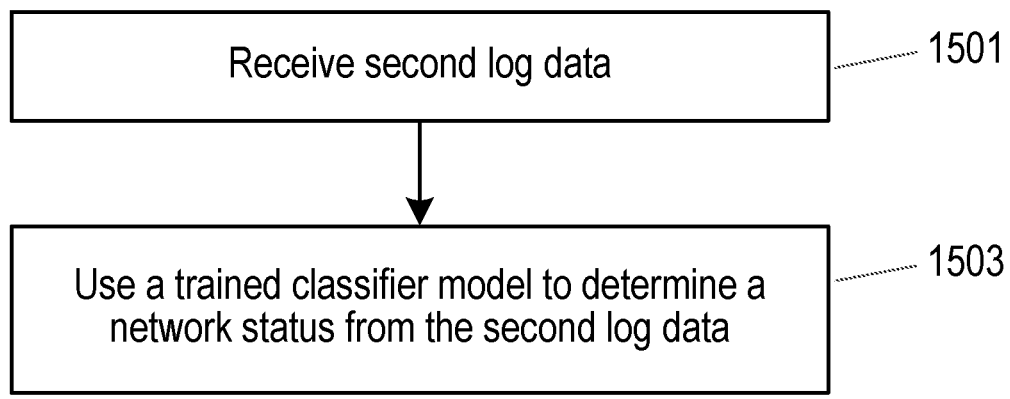
FIG. 15 is a flow chart illustrating a method of analysing log data.

FIG. 15 is a flow chart illustrating a method performed by an apparatus 116 for analysing log data relating to operations of one or more wireless devices and/or nodes in a communication network. The apparatus 116 may perform the method in response to executing suitably formulated computer readable code. The computer readable code may be embodied or stored on a computer readable medium, such as a memory chip, optical disc, or other storage medium. The computer readable medium may be part of a computer program product.

In step 1501, log data is received. This log data is referred to as 'second log data', as it is different to the first log data that is used to train the classifier model. In step 1503, the classifier model trained according to the method in FIG. 14 is used to determine the network status associated with the second log data. That is, the second log data is input to the trained classifier model and the model determines the network status associated with the second log data.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the scope of the disclosure. Various exemplary embodiments can be used together with one another, as well as interchangeably therewith, as should be understood by those having ordinary skill in the art.

The invention claimed is:

1. A method performed by an apparatus for training a classifier model to determine a network status relating to a communication network and/or a wireless device from log data, the method comprising:

extracting, from first log data relating to operations of one or more wireless devices and/or nodes in the communication network, a plurality of textual elements and a plurality of numerical elements;

transforming the plurality of textual elements to a first vector space to determine respective textual element vectors;

transforming the plurality of numerical elements to a second vector space to determine respective numerical element vectors;

embedding and clustering the textual element vectors and the numerical element vectors to determine a plurality of clusters of embedded vectors, wherein the embedding comprises, for a plurality of wireless device sessions, embedding at least one textual element vector and at least one numerical element vector into a single embedded vector representing the particular wireless device session; and training a classifier model to determine a network status from second log data, wherein the classifier model is trained using the plurality of clusters of embedded vectors, wherein the step of embedding and clustering is performed iteratively to jointly reduce an embedding loss and a clustering loss.

2. A method as claimed in claim 1, wherein the embedding is performed using an auto-encoder.

3. A method as claimed in claim 1, wherein the first log data is received from one or more wireless devices and/or nodes in the communication network.

4. A method as claimed in claim 1, wherein the first log data comprises log events relating to any one or more of: Radio Resource Control, RRC, signalling messages; Non-Access Stratum, NAS, layer signalling messages; S1 interface messages; X2 interface messages; physical layer measurements or measurement reports; and signalling traces for one or more nodes.

5. A method as claimed in claim 1, wherein the first log data comprises respective log data from multiple wireless devices and/or nodes, and wherein the method further comprises synchronising the respective log data from the multiple wireless devices and/or nodes.

6. A method as claimed in claim 1, wherein the first log data relates to operations of a plurality of wireless devices, and wherein the method further comprises identifying a respective wireless device or a respective wireless device session to which elements of the first log data relate.

7. A method as claimed in claim 1, wherein the step of transforming the plurality of textual elements uses Natural Language Processing, NLP.

8. A method as claimed in claim 7, wherein the NLP uses information specific to the communication network.

9. A method as claimed in claim 1, wherein the step of transforming the plurality of numerical elements comprises scaling and/or normalising one or more of the numerical elements.

10. A method as claimed in claim 1, wherein the method further comprises:
    determining the plurality of wireless device sessions, wherein a wireless device session comprises a time sequence of at least one textual element vector and at least one numerical element vector relating to a particular wireless device.

11. A method as claimed in claim 10, wherein the duration of a wireless device session or a number of element vectors in a wireless device session is determined by a predetermined session window size.

12. A method as claimed in claim 11, wherein at least two of the plurality of wireless device sessions partially overlap in time according to a session window overlap size.

13. A method as claimed in claim 1, wherein the embedding loss is calculated as a weighted sum of a numerical embedding loss and a textual embedding loss.

14. A method as claimed in claim 1, wherein the network status comprises or indicates a reason for a failure in the communication network.

15. A method as claimed in claim 1, wherein the classifier model is trained using the plurality of clusters of embedded vectors and information indicating a respective network status for the clusters.

16. A method performed by an apparatus for analysing second log data relating to operations of one or more wireless devices and/or nodes in a communication network, the method comprising:
    receiving second log data; and
    using a classifier model trained according to claim 1 to determine a network status from the received second log data.

17. An apparatus configured for training a classifier model to determine a network status relating to a communication network and/or a wireless device from log data, the apparatus comprising processor circuitry configured to:
    extract, from first log data relating to operations of one or more wireless devices and/or nodes in the communication network, a plurality of textual elements and a plurality of numerical elements;
    transform the plurality of textual elements to a first vector space to determine respective textual element vectors;
    transform the plurality of numerical elements to a second vector space to determine respective numerical element vectors;
    embed and cluster the textual element vectors and the numerical element vectors to determine a plurality of clusters of embedded vectors, wherein the embedding comprises, for a plurality of wireless device sessions, embedding at least one textual element vector and at least one numerical element vector into a single embedded vector representing the particular wireless device session;
    train a classifier model to determine a network status from second log data, wherein the classifier model is trained using the plurality of clusters of embedded vectors; and
    determining the plurality of wireless device sessions, wherein a wireless device session comprises a time sequence of at least one textual element vector and at least one numerical element vector relating to a particular wireless device,
    wherein the duration of a wireless device session or a number of element vectors in a wireless device session is determined by a predetermined session window size.

18. An apparatus as claimed in claim 17, wherein the apparatus is configured to perform the embedding using an auto-encoder.

19. An apparatus as claimed in claim 17, wherein the first log data is received from one or more wireless devices and/or nodes in the communication network.

* * * * *